United States Patent
Choi et al.

(10) Patent No.: US 12,436,839 B2
(45) Date of Patent: Oct. 7, 2025

(54) STORAGE DEVICE FOR SETTING PROHIBITED THRESHOLD VOLTAGE DISTRIBUTION

(71) Applicant: SK hynix Inc., Icheon-si (KR)

(72) Inventors: Suk Hwan Choi, Icheon-si (KR); Dong Hun Kwak, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 161 days.

(21) Appl. No.: 18/346,671

(22) Filed: Jul. 3, 2023

(65) Prior Publication Data

US 2024/0126642 A1    Apr. 18, 2024

(30) Foreign Application Priority Data

Oct. 17, 2022    (KR) .......................... 10-2022-0133469

(51) Int. Cl.
*G06F 11/00*    (2006.01)
*G06F 11/10*    (2006.01)

(52) U.S. Cl.
CPC .............................. *G06F 11/1004* (2013.01)

(58) Field of Classification Search
CPC .. G06F 11/1004; G06F 11/1052; G06F 11/00; G06F 11/0727; G06F 11/0781
See application file for complete search history.

(56) References Cited

U.S. PATENT DOCUMENTS

| | | | | |
|---|---|---|---|---|
| 7,352,638 | B2* | 4/2008 | Suitou | G11C 29/24 365/201 |
| 7,508,715 | B2* | 3/2009 | Lee | G11C 16/0483 365/185.2 |
| 7,898,864 | B2* | 3/2011 | Dong | G11C 11/5628 365/185.23 |
| 9,099,185 | B2 | 8/2015 | Kim et al. | |
| 9,230,665 | B2* | 1/2016 | Hosono | G11C 16/0483 |
| 9,583,201 | B1* | 2/2017 | Lee | G11C 16/10 |
| 9,715,430 | B2* | 7/2017 | Maffeis | G11C 29/52 |
| 10,755,786 | B2* | 8/2020 | Shimura | G11C 16/3459 |
| 10,942,799 | B1* | 3/2021 | Khakifirooz | G11C 16/14 |
| 10,984,867 | B1* | 4/2021 | Zhang | G11C 16/0483 |
| 12,190,954 | B2* | 1/2025 | Lee | G11C 16/0483 |
| 2019/0189218 | A1* | 6/2019 | Izumi | H10D 62/292 |

FOREIGN PATENT DOCUMENTS

KR    1020160129418 A    11/2016
KR    101832934 B1    2/2018

* cited by examiner

*Primary Examiner* — Esaw T Abraham
(74) *Attorney, Agent, or Firm* — WILLIAM PARK AND ASSOCIATES LTD.

(57) ABSTRACT

A storage device includes a memory device and a controller. The memory device includes a memory region configured by a plurality of memory cells. The controller is configured to set at least one prohibited threshold voltage distribution for the memory region based on a result of an operation on the memory region.

17 Claims, 15 Drawing Sheets

FIG. 6
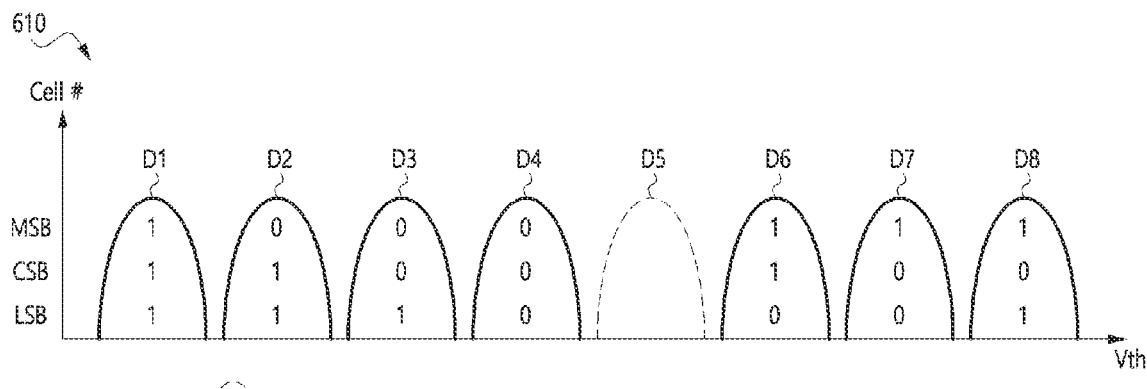
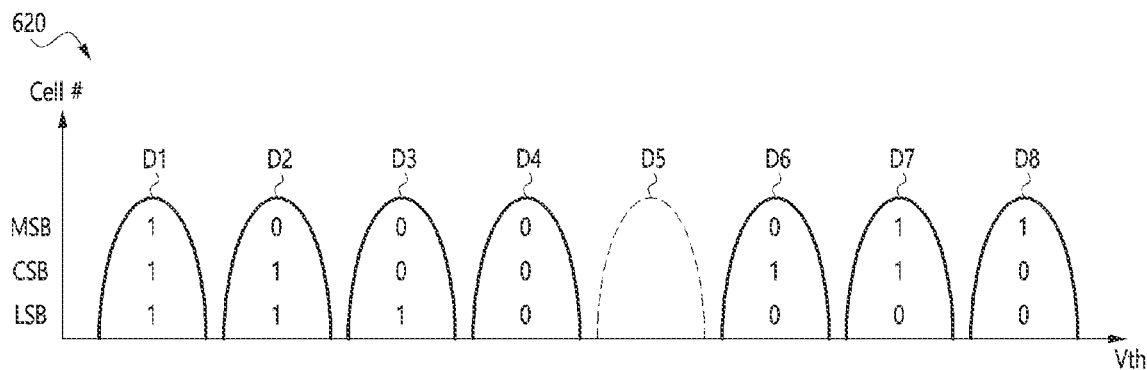

| | ST11 | ST12 | ... | ST1i | ... | ST1j |
|---|---|---|---|---|---|---|
| MSB | 1 | 0 | | 0 | | 1 |
| CSB | 1 | 0 | ... | 1 | ... | 0 |
| LSB | 0 | 0 | | 0 | | 0 |

↑ PROHIBITED DATA PATTERN (at ST1i)

DT2 — ST21, ST2j

| | ST21 | ... | ST2j |
|---|---|---|---|
| MSB | 0 | | 1 |
| CSB | 0 | ... | 1 |
| LSB | 0 | | 0 |

NO PROHIBITED DATA PATTERN

STORAGE DEVICE FOR SETTING PROHIBITED THRESHOLD VOLTAGE DISTRIBUTION

CROSS-REFERENCES TO RELATED APPLICATION

The present application claims priority under 35 U.S.C. § 119(a) to Korean application number 10-2022-0133469, filed on Oct. 17, 2022, in the Korean Intellectual Property Office, which is incorporated herein by reference in its entirety as set forth in full.

BACKGROUND

1. Technical Field

Various embodiments are related to a storage device including a memory device.

2. Related Art

A storage device may be configured to store therein data provided from an external device in response to a write request from is the external device. Furthermore, the storage device may be configured to provide stored data to the external device in response to a read request from the external device. The external device is an electronic device capable of processing data and may include a computer, a digital camera, a mobile phone and so forth. The storage device may be mounted in the external device or may be fabricated to be capable of being connected to and detached from the external device. The storage device may include a memory device configured to store therein data.

Memory cells within the memory device may deteriorate more and more as the memory device continues operating. A memory region that cannot be utilized anymore due to serious deterioration may be managed as a bad memory region. As a number of the bad memory regions increases, the memory device's storage capacity decreases and therefore cannot perform an optimized operation.

SUMMARY

In an embodiment, a storage device may include a memory device and a controller. The memory device may include a memory region configured by a plurality of memory cells. The controller may be configured to set at least one prohibited threshold voltage distribution for the memory region based on a result of an operation on the memory region.

In an embodiment, a storage device may include a memory device and a controller. The memory device may include a memory region. The controller may be configured to set at least one is prohibited threshold voltage distribution for the memory region based on a failure-number of data read from the memory region.

In an embodiment, a storage device may include a memory device and a controller. The memory device may include a memory region configured by memory cells. The controller may be configured to set a prohibited data pattern, among a plurality of data patterns respectively mapped to a plurality of threshold voltage distributions of the memory cells, for the memory region, configured to allow data, which does not include the prohibited data pattern, to be stored in the memory region and configured to prevent data, which includes the prohibited data pattern, from being stored in the memory region.

BRIEF DESCRIPTION OF THE DRAWINGS

FIG. 6 is a diagram illustrating a scheme that a controller in accordance with an embodiment sets a prohibited threshold voltage distribution based on a failure-number corresponding to each of first to eighth threshold voltage distributions illustrated in FIG. 5.

FIG. 7 is a diagram illustrating a scheme that a controller in accordance with an embodiment stores write data in a vulnerable memory region and a normal memory region.

DETAILED DESCRIPTION

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The drawings are not necessarily to scale and, in some instances, proportions may have been exaggerated in order to clearly is illustrate features of the embodiments. The terminology used herein is for the purpose of describing particular embodiments only and is not intended to be limiting of the disclosure.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, exemplary embodiments of the present disclosure will be described below with reference to the accompanying drawings.

In accordance with an embodiment, provided may be a storage device capable of reducing a loss of storage capacity of a memory device.

Figure 1:
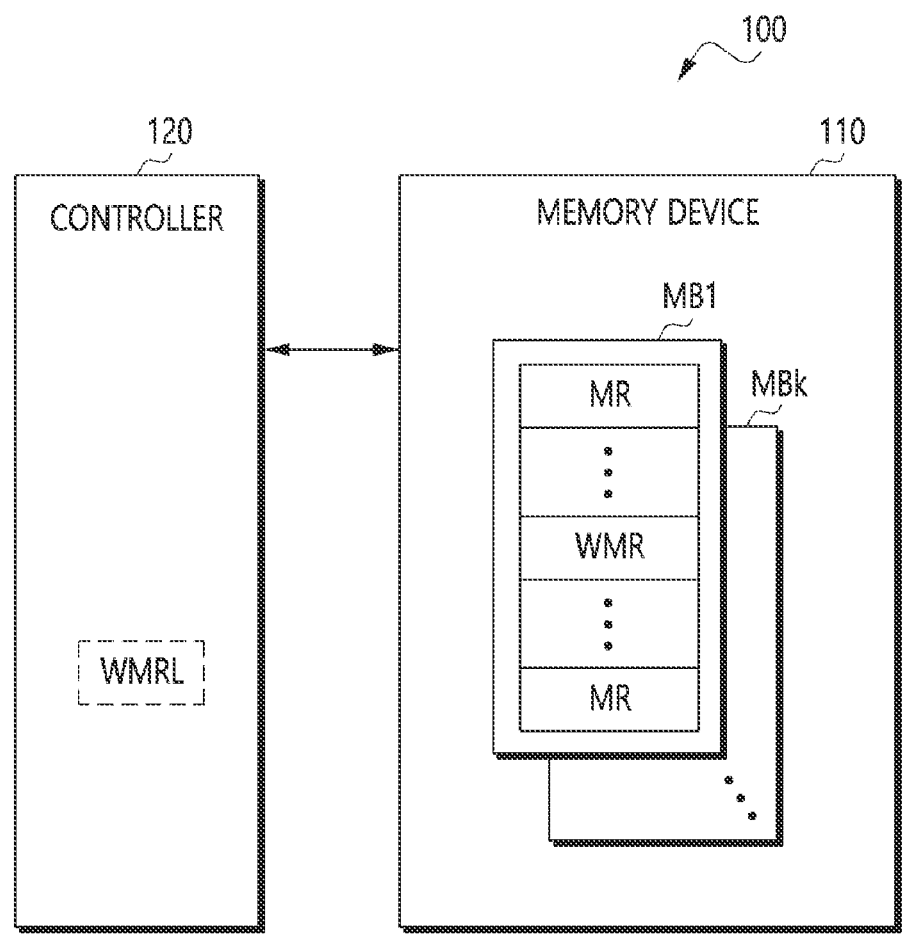
FIG. 1 is a block diagram illustrating an exemplary storage device in accordance with an embodiment.

FIG. 1 is a block diagram illustrating an exemplary storage device 100 in accordance with an embodiment.

The storage device 100 may be configured to store data provided from an external device in response to a write request from the external device. Furthermore, the storage device 100 may be is configured to provide stored data to the external device in response to a read request from the external device.

The storage device 100 may include a personal computer memory card international association (PCMCIA) card, a compact flash (CF) card, a smart media card, a memory stick, various multimedia cards (e.g., MMC, eMMC, RS-MMC and MMC-micro), secure digital (SD) cards (e.g., SD, Mini-SD and Micro-SD), a universal flash storage (UFS) or a solid-state drive (SSD).

The storage device 100 may include a memory device 110 and a controller 120.

The memory device 110 may operate under the control of the controller 120. Exemplary operations of the memory device 110 may include a read operation, a write operation (i.e., a program operation), an erase operation, and so forth.

The memory device 110 may include a plurality of memory blocks MB1 to MBk. Each of the memory blocks MB1 to MBk may include a plurality of memory regions MRs. The memory regions MRs may be accessed through different word lines. Each of the memory regions MRs may include a plurality of memory cells coupled to the corresponding word line.

The storage device 100 may be implemented by various types of memory device, such as a NAND flash memory, a 3-dimensional (3D) NAND flash memory, a NOR flash memory, a resistive random access memory (RRAM), a phase change RAM (PRAM), a Magneto-resistive RAM (MRAM), a ferroelectric RAM (FRAM), a spin is transfer torque RAM (SU-RAM), and so forth.

The controller 120 may control overall operations of the storage device 100. The controller 120 may control the storage device 100 in response to a request from an external device (not illustrated). For example, the controller 120 may write data into the memory device 110 in response to a write request from the external device and may read data from the memory device 110 in response to a read request from the external device.

In order to perform a managing operation that is internally required, the controller 120 may control the memory device 110 independently of the external device, i.e., even without a request from the external device. For example, the managing operation may include one or more of a wear-levelling operation, a garbage collection operation, an erase operation, and a read-reclaim operation. The managing operation may include operations of writing data into the memory device 110 and reading data from the memory device 110. In an embodiment, the managing operation may be performed in response to a request from an external device.

Even when a memory region WMR deteriorates due to an excessive use of the memory region WMR, the controller 120 might not immediately prohibit the use of the memory region WMR but restrictively use the memory region WMR, which may minimize or delay the loss of the storage capacity of the memory device 110. Specifically, the controller 120 may set at least one prohibited threshold voltage distribution for the memory region WMR according to a result of an is operation on the memory region WMR. A prohibited threshold voltage distribution may be a threshold voltage distribution that prevents memory cells from forming within the memory region WMR when data are stored in the memory cells.

For example, when data read through a read operation on the memory region WMR include fail bits, the number of fail bits exceeding a reference number, the controller 120 may set, as the prohibited threshold voltage distribution, a threshold voltage distribution corresponding to a highest failure-number, among the threshold voltage distributions of the memory cells within the memory region WMR, for the memory region WMR. For example, when a program operation fails on the memory region WMR, the controller 120 may set at least one prohibited threshold voltage distribution for the memory region WMR in a descending order from a highest threshold voltage distribution to a lowest threshold voltage distribution among the threshold voltage distributions of the memory cells within the memory region WMR. For example, when an erase operation fails on the memory region WMR, the controller 120 may set at least one prohibited threshold voltage distribution for the memory region WMR in an ascending order from a lowest threshold voltage distribution to a highest threshold voltage distribution among the threshold voltage distributions of the memory cells within the memory region WMR.

In an embodiment, the controller 120 may determine the failure-number according to a result of an operation on the memory region WMR. Based on which operation is being performed and a is failure-number calculated therein, the controller 120 may determine how many prohibited threshold voltage distributions are to be set at a time for the memory region WMR. For example, the failure-number during a read operation may be a number of fail bits that are error-corrected through an error-correcting operation on data read from the memory region WMR. For example, the failure-number during a program operation may be a number of memory cells having threshold voltages lower than a selected program verification voltage, among memory cells that are supposed to have threshold voltages higher than the selected program verification voltage within the memory region WMR. For example, the failure-number during an erase operation may be a number of memory cells having threshold voltages higher than an erase verification voltage among memory cells within the memory region WMR.

While setting at least one prohibited threshold voltage distribution for the memory region WMR, the controller 120 may set at least one prohibited data pattern for the memory region WMR. In an embodiment, the controller 120 may re-map permitted threshold voltage distributions and permitted data patterns, the permitted threshold voltage distributions being threshold voltage distributions other than the at least one prohibited threshold voltage distribution and the permitted data patterns being data patterns other than the at least one prohibited data pattern.

In an embodiment, before setting the prohibited threshold voltage distribution for the memory region WMR, the is controller 120 may determine the memory region WMR as a bad memory region when a current number of permitted threshold voltage distributions for the memory region WMR is determined to be lower than a threshold number. The controller 120 may prohibit the use of a bad memory region.

The controller 120 may manage, as a vulnerable memory region, the memory region WMR for which the prohibited threshold voltage distribution is set. For example, the controller 120 may manage a vulnerable memory region list WMRL including information regarding one or more vulnerable memory regions. The vulnerable memory region list WMRL may include information regarding an address of each vulnerable memory region and the prohibited threshold voltage distribution and the prohibited data pattern set for each vulnerable memory region. By selecting data to be stored in the vulnerable memory region WMR, the controller 120 may restrictively use the vulnerable memory region WMR. For example, when write data does not include a prohibited data pattern, the controller 120 may determine the write data to be stored in the vulnerable memory region WMR. On the other hand, when write data includes at least one prohibited data pattern, the controller 120 may determine the write data to be stored in a memory region other than the vulnerable memory region WMR.

In an embodiment, the controller 120 may adjust set values of the memory device 110 based on at least one prohibited threshold voltage distribution set for the memory region WMR. The is memory device 110 may perform an access operation on the memory region WMR according to the adjusted set values.

Figure 2:
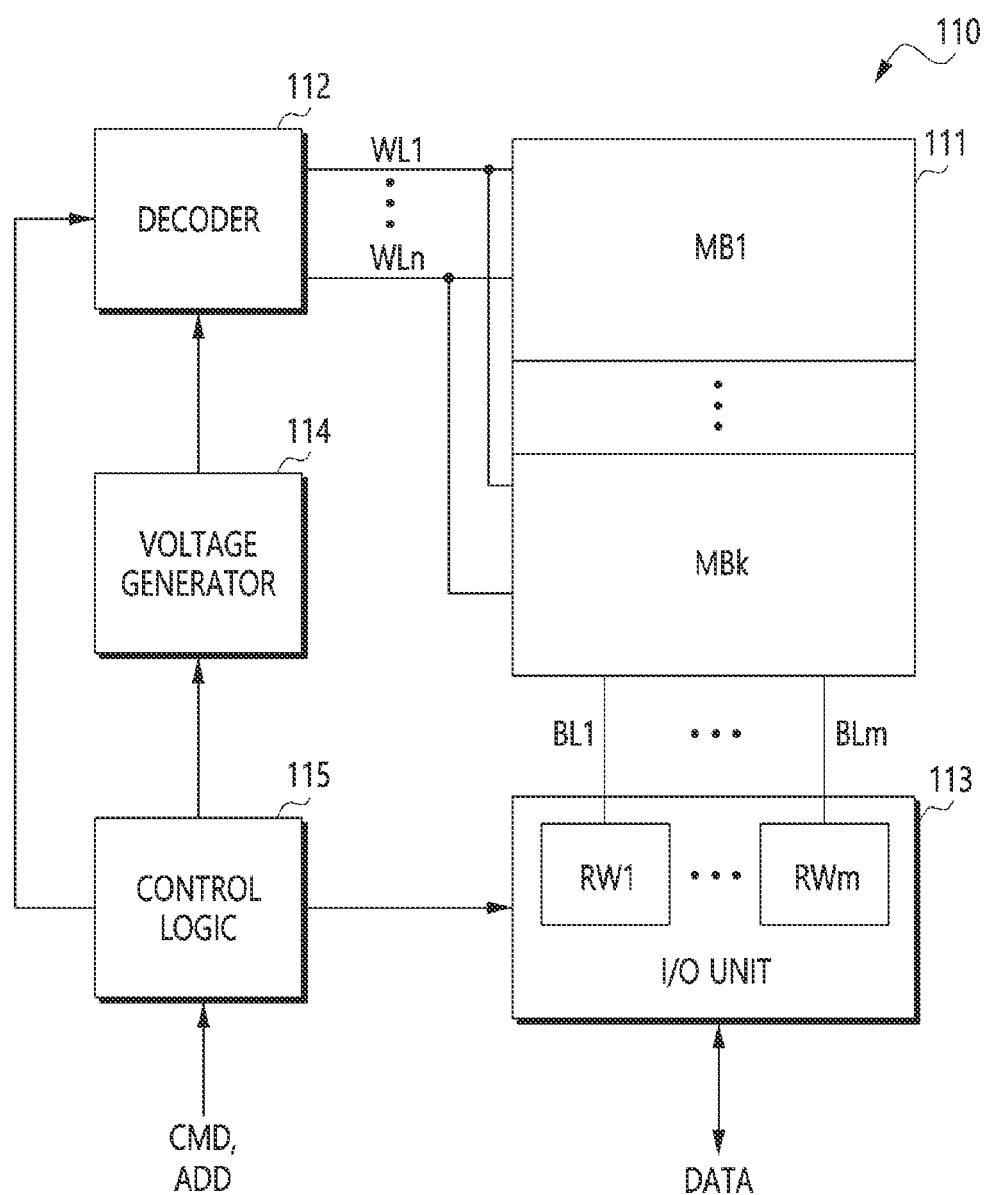
FIG. 2 is a block diagram exemplarily illustrating a memory device in accordance with an embodiment.

FIG. 2 is a block diagram exemplarily illustrating the memory device 110 in accordance with an embodiment.

Referring to FIG. 2, the memory device 110 may include a cell region 111, a decoder 112, an input/output (I/O) unit 113, a voltage generator 114, and a control logic 115.

The cell region 111 may include a plurality of memory blocks MB1 to MBk. Each of the memory blocks MB1 to MBk may be a unit that an erase operation is performed on. Each of the memory blocks MB1 to MBk may include a plurality of memory cells that can be accessed through word lines WL1 to WLn and bit lines BL1 to BLm.

The decoder 112 may be coupled to each of the memory blocks MB1 to MBk through word lines WL1 to WLn. The decoder 112 may operate under the control of the control logic 115. The decoder 112 may decode an address ADD provided from the controller 120 and may drive, according to a result of the decoding, the word lines WL1 to WLn with a voltage provided from the voltage generator 114.

The I/O unit 113 may be coupled to each of the memory blocks MB1 to MBk through the bit lines BL1 to BLm. The I/O unit 113 may include read/write circuits RW1 to RWm, respectively coupled to the bit lines BL1 to BLm. The I/O unit 113 may operate under the control of the control logic 115. The I/O unit 113 may operate as a write driver or a sense amplifier. Specifically, the I/O unit 113 may operate, during a write operation, as the write driver for storing data DATA provided from the controller 120 in the cell region 111. Also, the I/O unit 113 may operate, during a read operation, as the sense amplifier for reading out data DATA from the cell region 111 and output the readout data DATA.

The voltage generator 114 may generate voltages of various levels to be utilized for operations of the memory device 110. The voltages generated from the voltage generator 114 may be applied to memory cells within the cell region 111 through the word lines WL1 to WLn and the bit lines BL1 to BLm. For example, a program voltage and a program verification voltage generated during a program operation may be applied to a word line coupled to memory cells on which the program operation is to be performed. For example, a read voltage generated during a read operation may be applied to a word line coupled to memory cells on which the read operation is to be performed. For example, an erase voltage generated during an erase operation may be applied to a memory region within a memory block on which the erase operation is to be performed.

The control logic 115 may control, under the control of the controller 120, overall operations of the memory device 110. Specifically, based on a command CMD and an address ADD provided from the controller 120, the control logic 115 may control various operations (including a program operation, a read operation and an erase operation) of the memory device 110. The control logic 115 may store, therein, various set values that are referred to during an operation of the memory device 110 and may adjust the set values is under the control of the controller 120.

Figure 3:
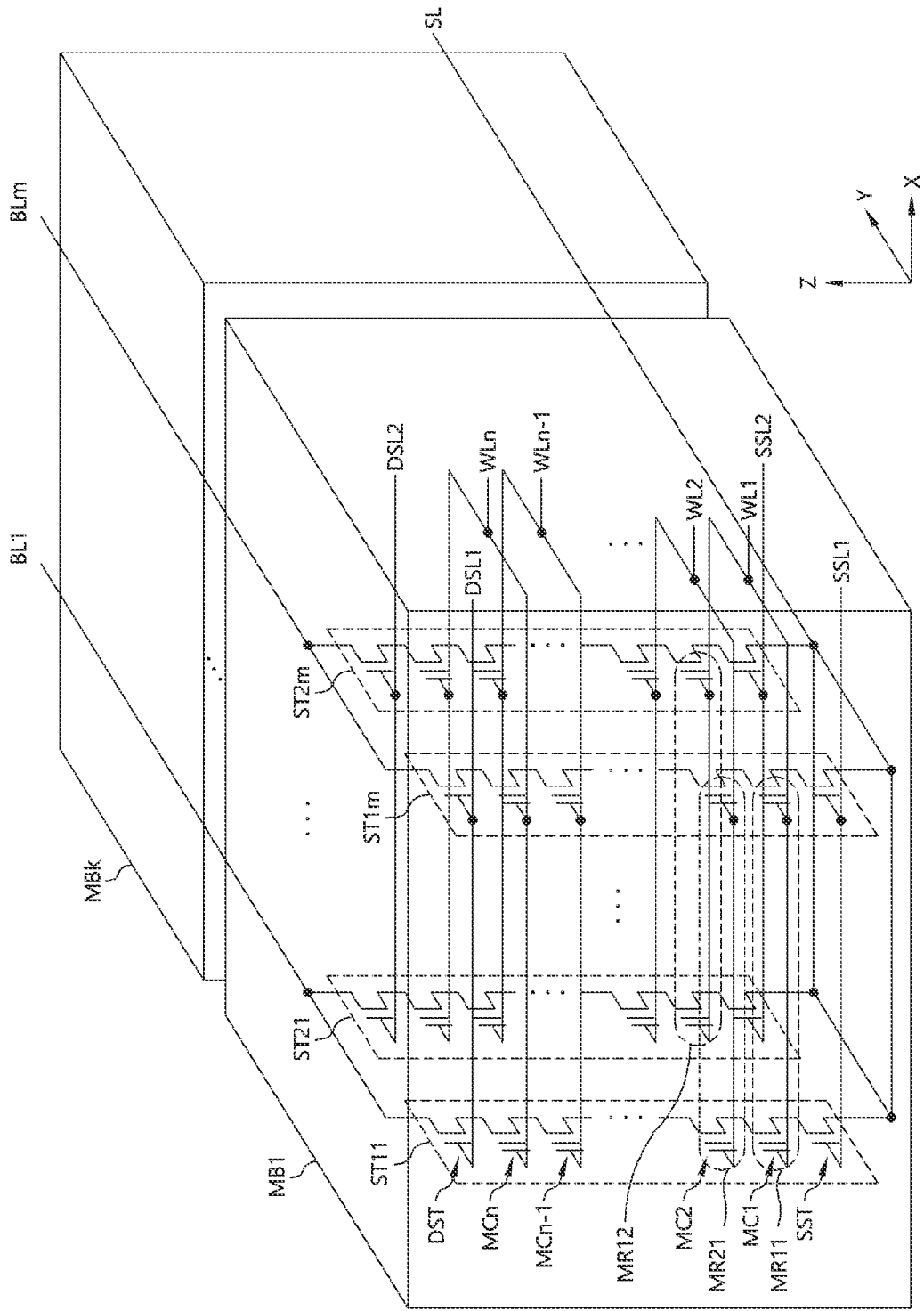
FIG. 3 is a circuit diagram illustrating a memory block in accordance with an embodiment.

FIG. 3 is a circuit diagram illustrating a memory block MB1 in accordance with an embodiment. Each of the memory blocks MB1 to MBk, illustrated in FIGS. 1 and 2, may be configured in a similar way to the memory block MB1 illustrated in FIG. 3.

Referring to FIG. 3, the memory block MB1 may include a plurality of strings ST11 to ST1*m* and ST21 to ST2*m*. Each of the strings ST11 to ST1*m* and ST21 to ST2*m* may extend along a vertical direction (i.e., a direction of the Z axis). Within the memory block MB1, "m" number of strings may be arranged along a row direction (i.e., a direction of the X axis). Although FIG. 3 exemplifies two (2) string groups (each string group being of "m" number of strings) arranged along a column direction (i.e., a direction of the Y axis), three (3) or more string groups may be arranged along the column direction.

The strings ST11 to ST1*m* and ST21 to ST2*m* may be configured in the same manner. For example, the string ST11 may include a source selection transistor SST, memory cells MC1 to MCn and a drain selection transistor DST, which are serially coupled to each other between the source line SL and the bit line BL1. A source of the source selection transistor SST may be coupled to the source line SL. A drain of the drain selection transistor DST may be coupled to the bit line BL1. The memory cells MC1 to MCn may be serially coupled to each other between the source selection transistor SST and the drain selection transistor DST.

Gates of the source selection transistors SST within a is group of the strings ST11 to ST1*m* or ST21 to ST2*m* arranged in the same row may be coupled to the same source selection line. For example, gates of the source selection transistors SST within the respective strings ST11 to ST1*m* arranged in the first row may be coupled to the source selection line SSL1. Gates of the source selection transistors SST within the respective strings ST21 to ST2m arranged in the second row may be coupled to the source selection line SSL2. In an embodiment, the source selection transistors SST within the respective strings ST11 to ST1m and ST21 to ST2m may be commonly coupled to a singles source selection line.

Gates of the drain selection transistors DST within a group of the strings ST11 to ST1m or ST21 to ST2m arranged in the same row may be coupled to the same drain selection line. For example, gates of the drain selection transistors DST within the respective strings ST11 to ST1m arranged in the first row may be coupled to the drain selection line DSL1. Gates of the drain selection transistors DST within the respective strings ST21 to ST2m arranged in the second row may be coupled to the drain selection line DSL2.

The strings arranged in the same column may be coupled to the same bit line. For example, the strings ST11 and ST21 arranged in the first column may be coupled to the bit line BL1. The strings ST1m and ST2m arranged in the m-th column may be coupled to the bit line BLm.

Gates of the memory cells arranged in the same location in the vertical direction may be coupled to the same word line. For example, gates of the memory cells arranged in the same location as the memory cell MC1 in the vertical direction within the strings ST11 to ST1m and ST21 to ST2m may be coupled to the word line WL1.

Among the memory cells within the memory block MB1, memory cells arranged in the same row and coupled to the same word line may configure a single memory region. For example, the memory cells arranged in the first row and coupled to the word line WL1 may configure a memory region MR11. The memory cells arranged in the second row and coupled to the word line WL1 may configure a memory region MR12. The memory cells arranged in the first row and coupled to the word line WL2 may configure a memory region MR21. Depending on a number of rows, each word line may be coupled to a plurality of memory regions. The memory cells configuring a single memory region may be programmed at the same time.

In an embodiment, the memory block MB1 may be coupled further to one or more dummy word lines as well as the word lines WL1 to WLn and may further include dummy memory cells coupled to the dummy word lines.

Figure 4:
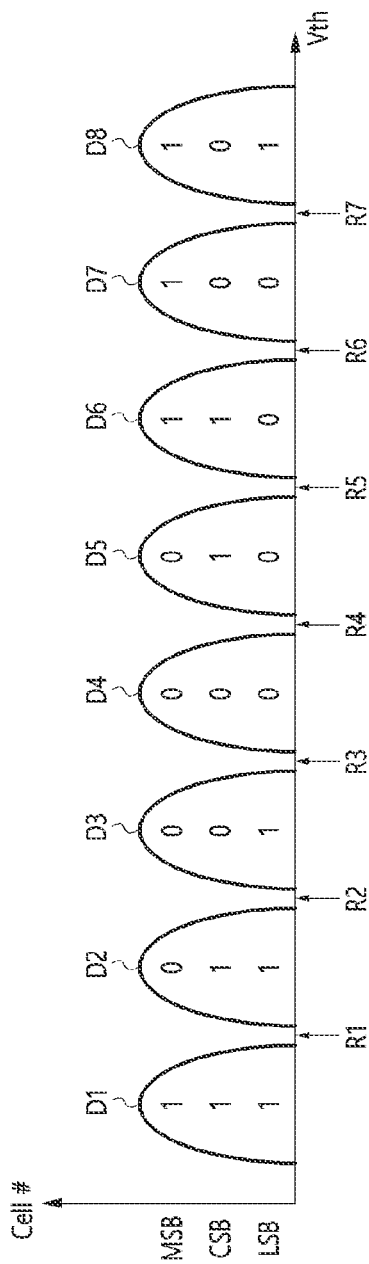
FIG. 4 is a diagram illustrating first to eighth threshold voltage distributions of memory cells in accordance with an embodiment.

FIG. 4 is a diagram illustrating first to eighth threshold voltage distributions D1 to D8 of memory cells in accordance with an embodiment. The horizontal axis (Vth) represents threshold voltages of the memory cells and the vertical axis (Cell #) represents numbers of memory cells having the threshold voltages.

For example, each of the memory cells, illustrated in FIG. 4, may be a triple level cell (TLC) configured to store therein 3 bits, i.e., a least significant bit (LSB), a central significant bit (CSB), and a most significant bit (MSB). In this case, the memory cells may form the first to eighth threshold voltage distributions D1 to D8 according to data stored therein. For example, the memory cells forming the first to eighth threshold voltage distributions D1 to D8 may be memory cells included in a single memory region. During a write operation, each memory cell may be located in one of the first to eighth threshold voltage distributions D1 to D8 according to 3-bit data stored therein. For example, a memory cell that stores data "111" therein may be located in the first threshold voltage distribution D1 that is mapped to a data pattern "111". That is, the first to eighth threshold voltage distributions D1 to D8 may be mapped to different data patterns. Each data pattern may represent data stored in a single memory cell located in a corresponding threshold voltage distribution mapped thereto. In an embodiment, when each of memory cells is configured to store k-bit data, the memory cells may form '2^k' number of threshold voltage distributions.

When each of the memory cells is configured to store k-bit data, a single memory region including the memory cells may logically include 'k' number of sub-regions, e.g., pages. When each of the memory cells is a TLC, a memory region including the memory cells may logically include three (3) pages, i.e., a LSB page (or a lowermost level page) configured to store therein a LSB, a CSB page (or a middle level page) configured to store therein a CSB and a MSB page (or a uppermost level page) configured to store therein a MSB.

When a read voltage is applied to a memory cell through a corresponding word line, the memory cell may be turned on or off according to a threshold voltage thereof. Specifically, the memory cell may be turned on when the read voltage is higher than the threshold voltage thereof and may be turned off when the read voltage is lower than the threshold voltage thereof. The memory cell may induce different amounts of current according to the memory cell being turned on or turned off. Within the I/O unit 113, one of the read/write circuits RW1 to RWm coupled to the memory cell may sense such a current to determine whether the threshold voltage thereof is higher or lower than the read voltage. Therefore, when first to seventh read voltages R1 to R7 are applied to a memory cell, the first to seventh read voltages R1 to R7 being respectively between the first to eighth threshold voltage distributions D1 to D8, the memory device 110 may determine whether the threshold voltage of the memory cell is higher or lower than each of the first to seventh read voltages R1 to R7. Consequently, by using the first to seventh read voltages R1 to R7, the memory device 110 may determine which threshold voltage distribution, among the first to eighth threshold voltage distributions D1 to D8, corresponds to the threshold voltage of the memory cell and may read data from the memory cell.

For example, LSB data stored in a LSB page may be read through the third and seventh read voltages R3 and R7. That is, when a memory cell has a threshold voltage lower than the third read voltage R3 or higher than the seventh read voltage R7, LSB data having a value is of one (1) may be read from the memory cell. When a memory cell has a threshold voltage between the third read voltage R3 and the seventh read voltage R7, LSB data having a value of zero (0) may be read from the memory cell. Similarly, CSB data stored in a CSB page may be read through the second, fourth, and sixth read voltages R2, R4, and R6. MSB data stored in a MSB page may be read through the first and fifth read voltages R1 and R5.

Hereinafter, a scheme of setting at least one prohibited threshold voltage distribution for the memory region WMR, illustrated in FIG. 1, and restrictively utilizing the memory region WMR will be described.

Figure 5:
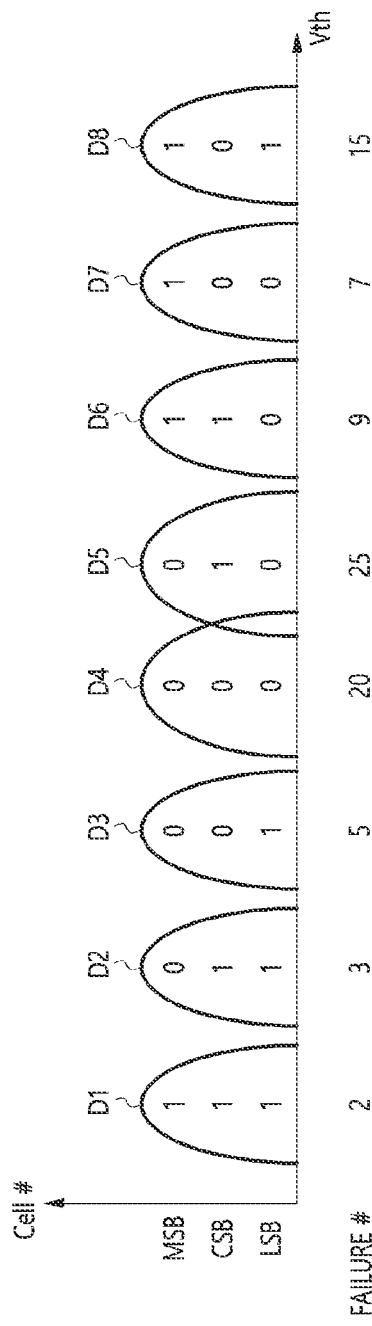
FIG. 5 is a diagram illustrating a failure-number corresponding to each of first to eighth threshold voltage distributions and determined during a read operation in accordance with an is embodiment.

FIG. 5 is a diagram illustrating a failure-number corresponding to each of first to eighth threshold voltage distributions D1 to D8, determined during a read operation in accordance with an embodiment.

Referring to FIG. 5, the controller 120 may perform an error-correcting operation on data read from the memory region WMR to determine fail bits included in the read data. Fail bits may be bits that are error-corrected through the error-correcting operation on the read data. The controller 120 may determine which threshold voltage distribution, among the first to eighth threshold voltage distributions D1 to D8, corresponds to a fail bit. That is, based on the fail bit being read from the memory cell, the controller 120 may determine the corresponding threshold voltage distribution for a memory cell. Specifically, when the controller 120 reads all bits from a memory cell is from which a fail bit is read, the controller 120 may determine the corresponding threshold voltage distribution for the memory cell based on a data pattern of the read bits. For example, when the controller 120 reads bits of a data pattern "111" from the memory cell from which a fail bit is read, the controller 120 may determine that the memory cell corresponds to the first threshold voltage distribution D1 and may determine that the fail bit corresponds to the first threshold voltage distribution D1.

In the above-described manner, the controller 120 may determine a corresponding threshold voltage distribution for each of the fail bits. Then, the controller 120 may count a number of fail bits, corresponding to each of the first to eighth threshold voltage distributions D1 to D8, as a failure-number corresponding to the corresponding threshold voltage distribution. Fail bits may largely occur for threshold voltage distributions overlapping each other such as the fourth and fifth threshold voltage distributions D4 and D5 illustrated in FIG. 5.

FIG. 6 is a diagram illustrating a scheme that the controller 120 in accordance with an embodiment sets a prohibited threshold voltage distribution based on the failure-number corresponding to each of the first to eighth threshold voltage distributions D1 to D8 illustrated in FIG. 5.

As illustrated in case 610 of FIG. 6, the controller 120 may set a prohibited threshold voltage distribution for the memory region WMR based on the failure-numbers respectively corresponding is to the first to eighth threshold voltage distributions D1 to D8. For example, a highest failure-number, among the failure-numbers, may correspond to the fifth threshold voltage distribution D5 among the first to eighth threshold voltage distributions D1 to D8. In this case, the controller 120 may set the fifth threshold voltage distribution D5 as the prohibited threshold voltage distribution and may control memory cells within the memory region WMR not to form the fifth threshold voltage distribution D5. Remaining threshold voltage distributions other than the fifth threshold voltage distribution D5, i.e., the first to fourth and sixth to eighth threshold voltage distributions D1 to D4 and D6 to D8 may be permitted threshold voltage distributions for the memory region WMR. The controller 120 may control memory cells within the memory region WMR to form only the permitted threshold voltage distributions. The controller 120 may manage, through the vulnerable memory region list WMRL, the memory region WMR for which the prohibited threshold voltage distribution is set.

The controller 120 may set a prohibited data pattern for the memory region WMR and may control any memory cell within the memory region WMR not to store therein the prohibited data pattern. Remaining data patterns other than the prohibited data pattern may be permitted data patterns. For example, the controller 120 may set, as the prohibited data pattern, a data pattern mapped to the fifth threshold voltage distribution D5 that is set as the prohibited threshold voltage distribution. The controller 120 may keep the mapping relationships respectively between the permitted threshold voltage is distributions and the permitted data patterns despite the setting of the prohibited threshold voltage distribution. The memory cells within the memory region WMR may be controlled not to store therein the prohibited data pattern and therefore might not form the prohibited threshold voltage distribution.

In an embodiment as illustrated in case 620 of FIG. 6, the controller 120 may change, when setting the prohibited threshold voltage distribution, the mapping relationships respectively between the permitted threshold voltage distributions and the permitted data patterns differently from the mapping relationships before the setting of the prohibited threshold voltage distribution. That is, the controller 120 may re-map the permitted threshold voltage distributions and the permitted data patterns when setting the prohibited threshold voltage distribution. For example, the controller 120 may set, as the prohibited data pattern, a data pattern that is mapped to the highest eighth threshold voltage distribution D8 before the setting of the prohibited threshold voltage distribution. That is, the prohibited threshold voltage distribution might not have any relationship with the prohibited data pattern. In the case 620 different from the case 610, the permitted data patterns mapped to the permitted threshold voltage distributions may still be of the grey code.

In an embodiment, when the two (2) highest failure-numbers respectively correspond to neighboring threshold voltage distributions, among the first to eighth threshold voltage distributions D1 to D8, the controller 120 may set, as the prohibited threshold voltage distribution for the memory region WMR, at least one of the neighboring threshold voltage distributions. For example, as illustrated in FIG. 5, the controller 120 may determine that the fourth and fifth threshold voltage distributions D4 and D5, which corresponds to the two (2) highest failure-numbers, among failure-numbers respectively corresponding to the first to eighth threshold voltage distributions D1 to D8, overlaps with each other and may set at least one of the fourth and fifth threshold voltage distributions D4 and D5 as the prohibited threshold voltage distribution for the memory region WMR.

In an embodiment, the controller 120 may set a plurality of prohibited threshold voltage distributions at a time. For example, the controller 120 may set a predetermined number of prohibited threshold voltage distributions according to a descending order of the failure-numbers respectively corresponding to the first to eighth threshold voltage distributions D1 to D8. For example, when setting a three (3) prohibited threshold voltage distributions at a time according to the descending order of the failure-numbers respectively corresponding to the first to eighth threshold voltage distributions D1 to D8, exemplified in FIG. 5, the controller 120 may set the fourth, fifth, and eighth threshold voltage distributions D4, D5, and D8 as the three (3) prohibited threshold voltage distributions. The controller 120 may set data patterns mapped respectively to the prohibited threshold voltage distributions as the prohibited data patterns. In an embodiment, the controller 120 may set a predetermined number of data patterns that do not have any relationship with the prohibited is threshold voltage distributions as the prohibited data patterns.

In an embodiment, the controller 120 may determine how many prohibited threshold voltage distributions are to be set at a time for the memory region WMR based on the failure-number corresponding to the data read from the memory region WMR, i.e., a number of fail bits within the read data. For example, the controller 120 may set, at a time, a greater number of prohibited threshold voltage distributions for the memory region WMR as the failure-number corresponding to the data read from the memory region WMR increases. For example, the controller 120 may determine the number, of which prohibited threshold voltage distributions are to be set at a time for the memory region WMR, by comparing two (2) or more reference numbers with the failure-number corresponding to the data read from the memory region WMR. When the failure-number corresponding to the data read from the memory region WMR is a first reference number or less, the controller 120 might not set a prohibited threshold voltage distribution for the memory region WMR. When the failure-number corresponding to the data read from the memory region WMR is a second reference number or less and greater than the first reference number, the controller 120 may set a single prohibited threshold voltage distribution for the memory region WMR. When the failure-number corresponding to the data read from the memory region WMR is greater than the second reference number, the controller 120 may set two (2) prohibited threshold voltage distributions for the memory region WMR.

The controller 120 may further set, according to the above-described scheme, another prohibited threshold voltage distribution and another prohibited data pattern for a vulnerable memory region after having previously set at least one prohibited threshold voltage distribution and at least one prohibited data pattern.

In an embodiment, the controller 120 may also set, for each and every memory region within a memory block (e.g., the memory block MB1 illustrated in FIG. 1) including the memory region WMR, at least one prohibited threshold voltage distribution and at least one prohibited data pattern, which are set for the memory region WMR.

FIG. 7 is a diagram illustrating a scheme that the controller 120, in accordance with an embodiment, stores write data in a vulnerable memory region and a normal memory region.

Referring to FIG. 7, the controller 120 may select write data to be stored in a vulnerable memory region. In other words, when there is write data to be stored in the memory device 110, the controller 120 may determine whether to store the write data in the vulnerable memory region in consideration of the prohibited data pattern set for the vulnerable memory region.

Specifically, first write data DT1 may be configured by data sets ST11 to ST1$j$ to be stored in respective memory cells. Each of the data sets ST11 to ST1$j$ may be configured by a LSB, a CSB, and a MSB to be stored in a memory cell. By comparing each of the data sets ST11 to ST1$j$ with the prohibited data pattern set for the vulnerable memory region, the controller 120 may determine whether is the first write data DT1 includes the prohibited data pattern. For example, when data pattern of "010" is the prohibited data pattern set for the vulnerable memory region, the controller 120 may determine not to store the first write data DT1 in the vulnerable memory region because the data set ST1$i$ has the prohibited data pattern. Therefore, the controller 120 may determine to store the first write data DT1 in a normal memory region, i.e., another memory region other than the vulnerable memory region.

On the other hand, the controller 120 may store, in the vulnerable memory region, second write data DT2 that does not include any prohibited data pattern set for the vulnerable memory region. When the second write data DT2 is stored in the vulnerable memory region, memory cells within the vulnerable memory region may correspond to permitted threshold voltage distributions other than the prohibited threshold voltage distribution.

In an embodiment, in order to maximize the operational performance for the vulnerable memory region, the controller 120 may adjust the set values of the memory device 110. The controller 120 may adjust the set values of the memory device 110 before utilizing the vulnerable memory region.

The set values may include various voltage levels and various parameters, the various voltage levels being applied to the word lines WL1 to WLn and bit lines BL1 to BLm during a program operation, a read operation, and an erase operation, and the various parameters being utilized for the operation of the memory device 110. The controller 120 may provide the memory device 110 with a separate setting command to adjust the set values.

The controller 120 may control, through a first operational command, an operation on a normal memory region within the memory device 110. The first operational command may direct an operation to be performed according to base set values of the memory device 110. In response to the first operational command, the memory device 110 may perform, based on the base set values, an access operation on the normal memory region.

The controller 120 may control, through a second operational command, an operation on a vulnerable memory region within the memory device 110. The second operational command may direct an operation to be performed according to adjusted set values of the memory device 110. The first operational command and the second operational command may be distinguished from each other. In response to the second operational command, the memory device 110 may perform, based on the adjusted set values, an access operation on the vulnerable memory region.

Specifically, during a read operation on the vulnerable memory region, the memory device 110 may skip, according to the adjusted set values, a step of applying at least one read voltage, which is adjacent to the prohibited threshold voltage distribution set for the vulnerable memory region, to memory cells within the vulnerable memory region. Specifically, during a program operation on the vulnerable memory region, the memory device 110 may skip, according to the adjusted set values, a step of applying at least one is program verification voltage, which is adjacent to the prohibited threshold voltage distribution set for the vulnerable memory region, to memory cells within the vulnerable memory region. Specifically, during a program operation on the vulnerable memory region, the controller 120 may apply, according to the adjusted set values and to a memory cell within the vulnerable memory region, a program voltage higher than a default program voltage to control the memory cell to correspond to one of permitted threshold voltage distributions other than the prohibited threshold voltage distribution set for the vulnerable memory region. Specifically, when detecting, from write data, the prohibited data pattern set for the vulnerable memory region during a program operation on the vulnerable memory region, the controller 120 may apply a program-prohibited voltage to a memory cell within the vulnerable memory region according to the adjusted set values. To sum up, in consideration of the margin extension between the permitted threshold voltage distributions because of the prohibited threshold voltage distribution that is not to be formed for the vulnerable memory region, the controller 120 may adjust the set values of the memory device 110 and the memory device 110 may perform, with the maximized performance, an operation on the vulnerable memory region according to the adjusted set values.

Figure 8:
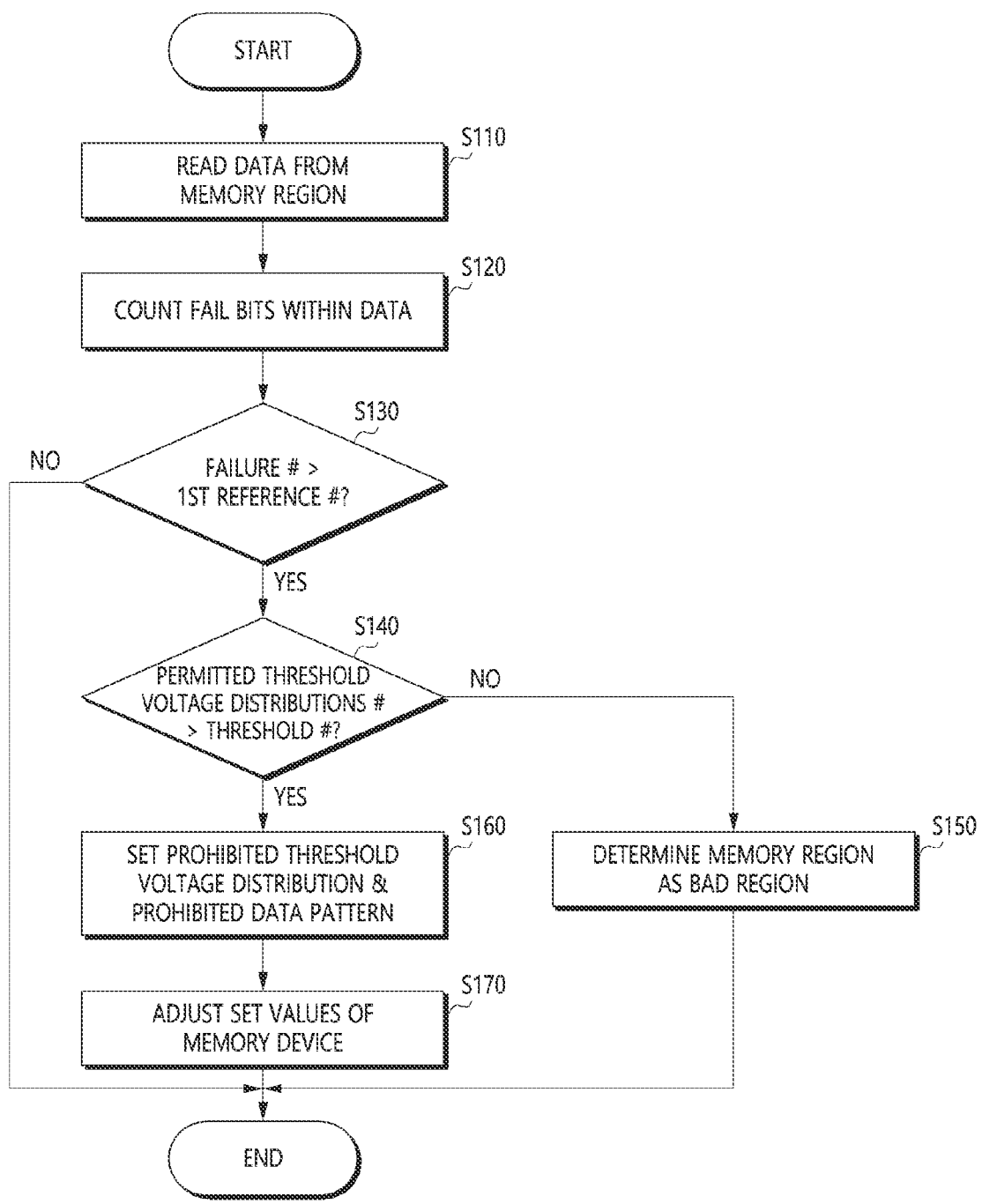
FIG. 8 is a flowchart illustrating an operation of a controller in accordance with an embodiment.

FIG. 8 is a flowchart illustrating an operation of the controller 120 in accordance with an embodiment. FIG. 8 illustrates a process of determining a memory region WMR as a vulnerable memory region based on a result of read operation on the memory region WMR.

Referring to FIG. 8, at step S110, the controller 120 may read data from the memory region WMR. The read data may be data stored in at least one sub-region within the memory region WMR. The controller 120 may read data from the memory region WMR in response to or regardless of a read request from a host device.

At step S120, the controller 120 may count, as the failure-number, a number of fail bits included in the read data. For example, the controller 120 may count the number of fail bits that are error-corrected through an error-correcting operation on the read data.

At step S130, the controller 120 may determine whether the failure-number corresponding to the read data is higher than the first reference number. When the failure-number is not higher than the first reference number, the process may end. When the failure-number is higher than the first reference number, the process may proceed to step S140. In an embodiment, when the number of fail bits cannot be counted at step S120, i.e., when the error-correcting operation fails on the read data, the controller 120 may determine the failure-number corresponding to the read data as higher than the first reference number.

At step S140, the controller 120 may determine whether a current number of permitted threshold voltage distributions for the memory region WMR is higher than a threshold number. For example, the threshold number may be two (2). When the current number of permitted threshold voltage distributions is not higher than the threshold number, the process may proceed to step S150. When the is current number of permitted threshold voltage distributions is higher than the threshold number, the process may proceed to step S160.

At step S150, the controller 120 may determine the memory region WMR to be a bad memory region. The controller 120 may prohibit use of the bad memory region. In an embodiment, the controller 120 may set the memory block MB1 including the memory region WMR as a bad memory block and may prohibit use of the bad memory block.

At step S160, the controller 120 may determine the memory region WMR as a vulnerable memory region and may set at least one prohibited threshold voltage distribution and at least one prohibited data pattern for the memory region WMR. The controller 120 may remap the permitted threshold voltage distributions and the permitted data patterns for the memory region WMR.

At step S170, the controller 120 may adjust the set values of the memory device 110 based on the at least one prohibited threshold voltage distribution and at least one prohibited data pattern set for the memory region WMR.

Figure 9:
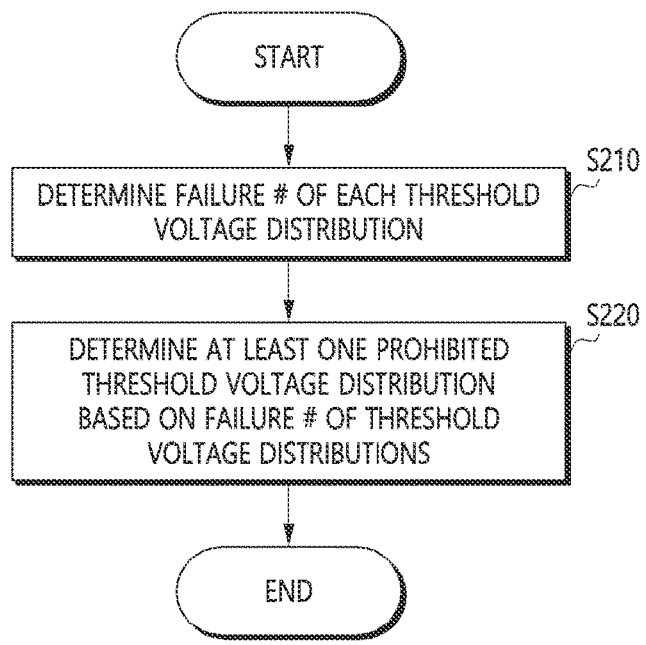
FIG. 9 is a flowchart illustrating an operation of a controller in accordance with an embodiment determining at least one prohibited threshold voltage distribution based on a failure-number corresponding to each of threshold voltage distributions.

FIG. 9 is a flowchart illustrating an operation of the controller 120 in accordance with an embodiment determining at least one prohibited threshold voltage distribution based on a failure-number corresponding to each of threshold voltage distributions. In an embodiment, steps illustrated in FIG. 9 may be performed at step S160 illustrated in FIG. 8.

Referring to FIG. 9, at step S210, the controller 120 may is determine the failure-number for each of a plurality of threshold voltage distributions that memory cells within the memory region WMR form. Specifically, the controller 120 may count, as the failure-number, a number of fail bits corresponding to each of the plurality of threshold voltage distributions.

At step S220, the controller 120 may set at least one prohibited threshold voltage distribution, among the plurality of threshold voltage distributions, based on the failure-numbers respectively corresponding to the plurality of threshold voltage distributions. For example, at least one prohibited threshold voltage distribution may be a threshold voltage distribution, among the plurality of threshold voltage distributions, corresponding to the highest failure-number. For example, when the two (2) highest failure numbers, among the failure-numbers, respectively corresponding to the plurality of threshold voltage distributions, respectively correspond to neighboring threshold voltage distributions, at least one prohibited threshold voltage distribution may include at least one of the neighboring threshold voltage distributions. For example, at least one prohibited threshold voltage distribution may include the highest threshold voltage distribution (i.e., D8 in FIG. 4) of the plurality of threshold voltage distributions. For example, at least one prohibited threshold voltage distribution may include the lowest threshold voltage distribution (i.e., D1 in FIG. 4) of the plurality of threshold voltage distributions.

Figure 10:
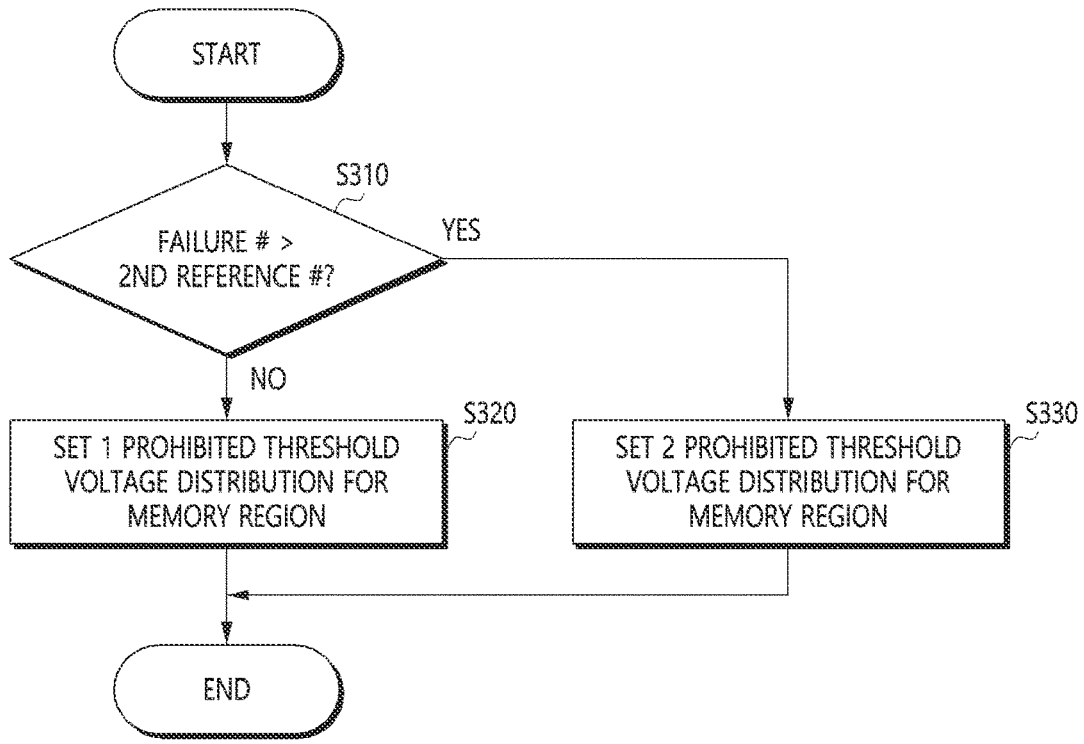
FIG. 10 is a flowchart illustrating an operation of a controller in accordance with an embodiment determining how many prohibited threshold voltage distributions are to be set for a memory region, based on a failure-number corresponding to the data read from the memory region.

FIG. 10 is a flowchart illustrating an operation of the is controller 120, in accordance with an embodiment, determining how many prohibited threshold voltage distributions are to be set for the memory region WMR based on a failure-number corresponding to the data read from the memory region WMR. In an embodiment, steps illustrated in FIG. 10 may be performed at step S160 illustrated in FIG. 8.

Referring to FIG. 10, at step S310, the controller 120 may determine whether the failure-number corresponding to the data read from the memory region WMR is higher than the second reference number. When the failure-number is not higher than the second reference number, the process may proceed to step S320. When the failure-number is higher than the second reference number, the process may proceed to step S330.

At step S320, the controller 120 may determine to set, at a time, a single prohibited threshold voltage distribution for the memory region WMR.

At step S330, the controller 120 may determine to set, at a time, two (2) prohibited threshold voltage distributions for the memory region WMR.

Figure 11:
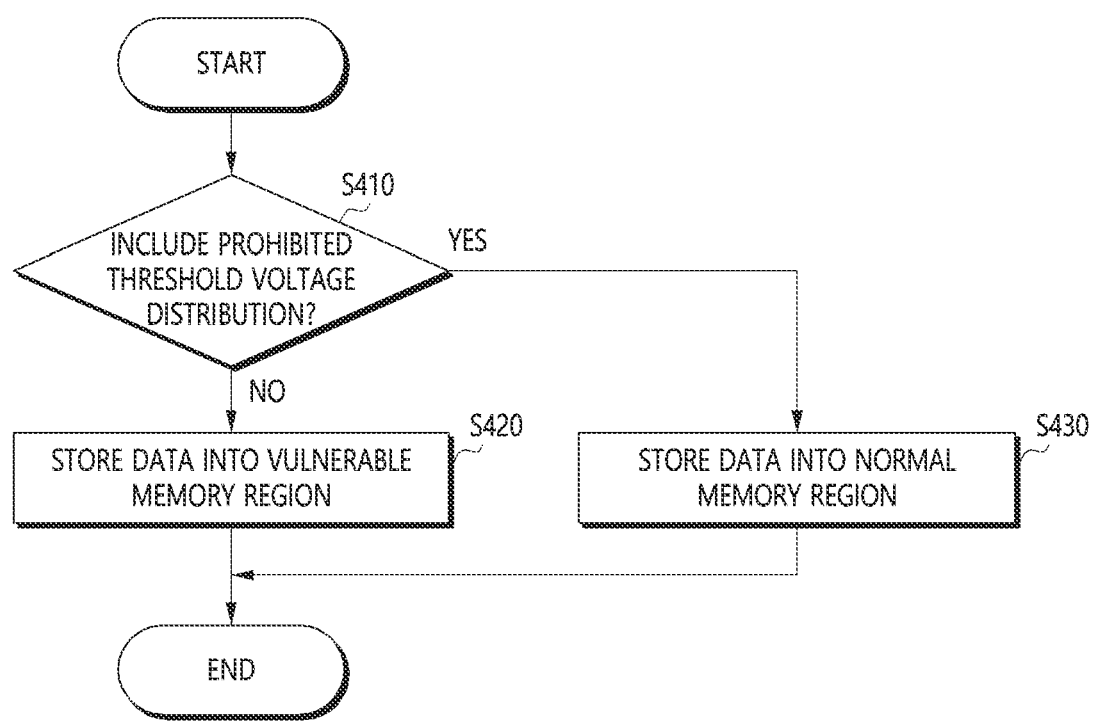
FIG. 11 is a flowchart illustrating an operation of a controller in accordance with an embodiment determining a memory region into which data is to be stored.

FIG. 11 is a flowchart illustrating an operation of the controller 120 in accordance with an embodiment determining a memory region into which data is to be stored.

Referring to FIG. 11, at step S410, when there is write data to be stored in the memory device 110, the controller 120 may determine whether the write data includes any prohibited data pattern is set for a vulnerable memory region. In order to detect a prohibited data pattern from the write data, the controller 120 may refer to the vulnerable memory region list WMRL including information regarding vulnerable memory regions. When the write data does not include any prohibited data pattern set for a vulnerable memory region, the process may proceed to step S420. When the write data include any prohibited data pattern set for a vulnerable memory region, the process may proceed to step S430.

At step S420, the controller 120 may determine to store the write data in a vulnerable memory region.

At step S430, the controller 120 may determine to store the write data in a normal memory region.

Figure 12:
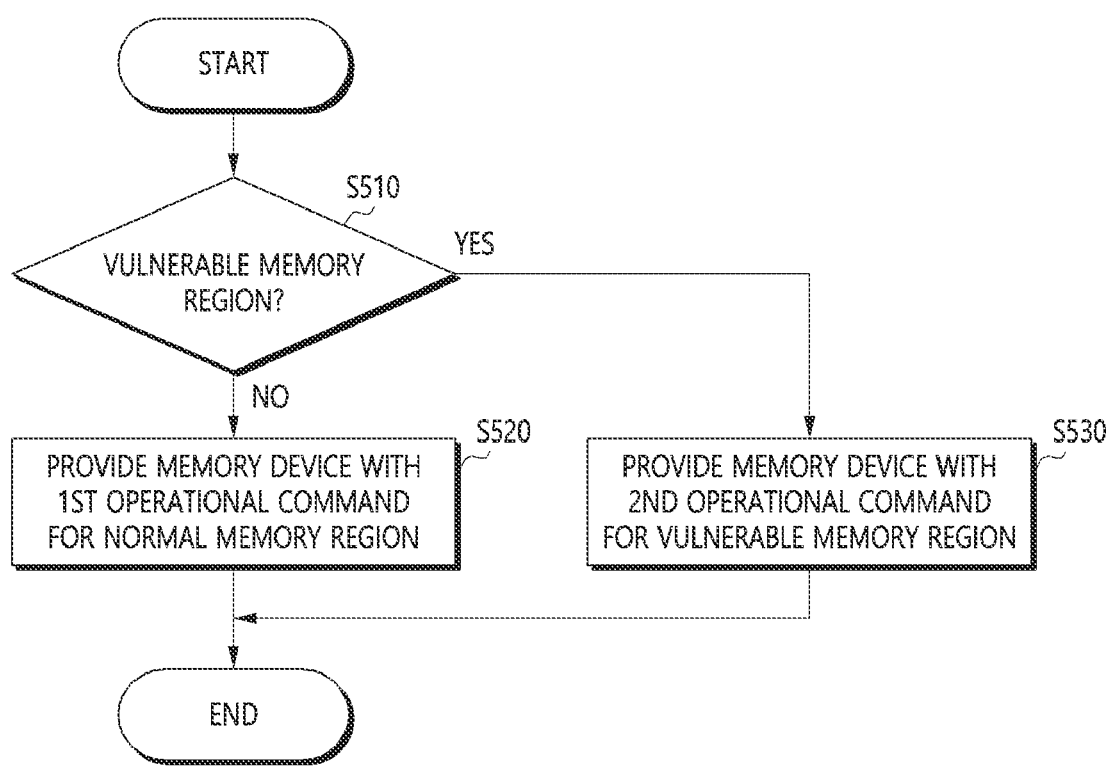
FIG. 12 is a flowchart illustrating an operation of a controller accessing a memory device in accordance with an embodiment.

FIG. 12 is a flowchart illustrating an operation of the controller 120 accessing the memory device 110 in accordance with an embodiment.

Referring to FIG. 12, at step S510, the controller 120 may determine whether a memory region to be accessed is a vulnerable memory region. In order to determine whether the memory region to be accessed is a vulnerable memory region, the controller 120 may refer to the vulnerable memory region list WMRL including information regarding vulnerable memory regions. When the memory region to be accessed is not a vulnerable memory region, the process may proceed to step S520. When the memory region to be accessed is a vulnerable memory region, the process may proceed to step S530.

At step S520, the controller 120 may provide the memory is device 110 with a first operational command for a normal memory region. The first operational command may direct an operation to be performed according to base set values of the memory device 110. In response to the first operational command, the memory device 110 may perform an access operation on the normal memory region based on the base set values.

At step S530, the controller 120 may provide the memory device 110 with a second operational command for a vulnerable memory region. The second operational command may direct an operation to be performed according to adjusted set values of the memory device 110. The first operational command and the second operational command may be distinguished from each other. In response to the second operational command, the memory device 110 may perform an access operation on the vulnerable memory region based on the adjusted set values.

Figure 13:
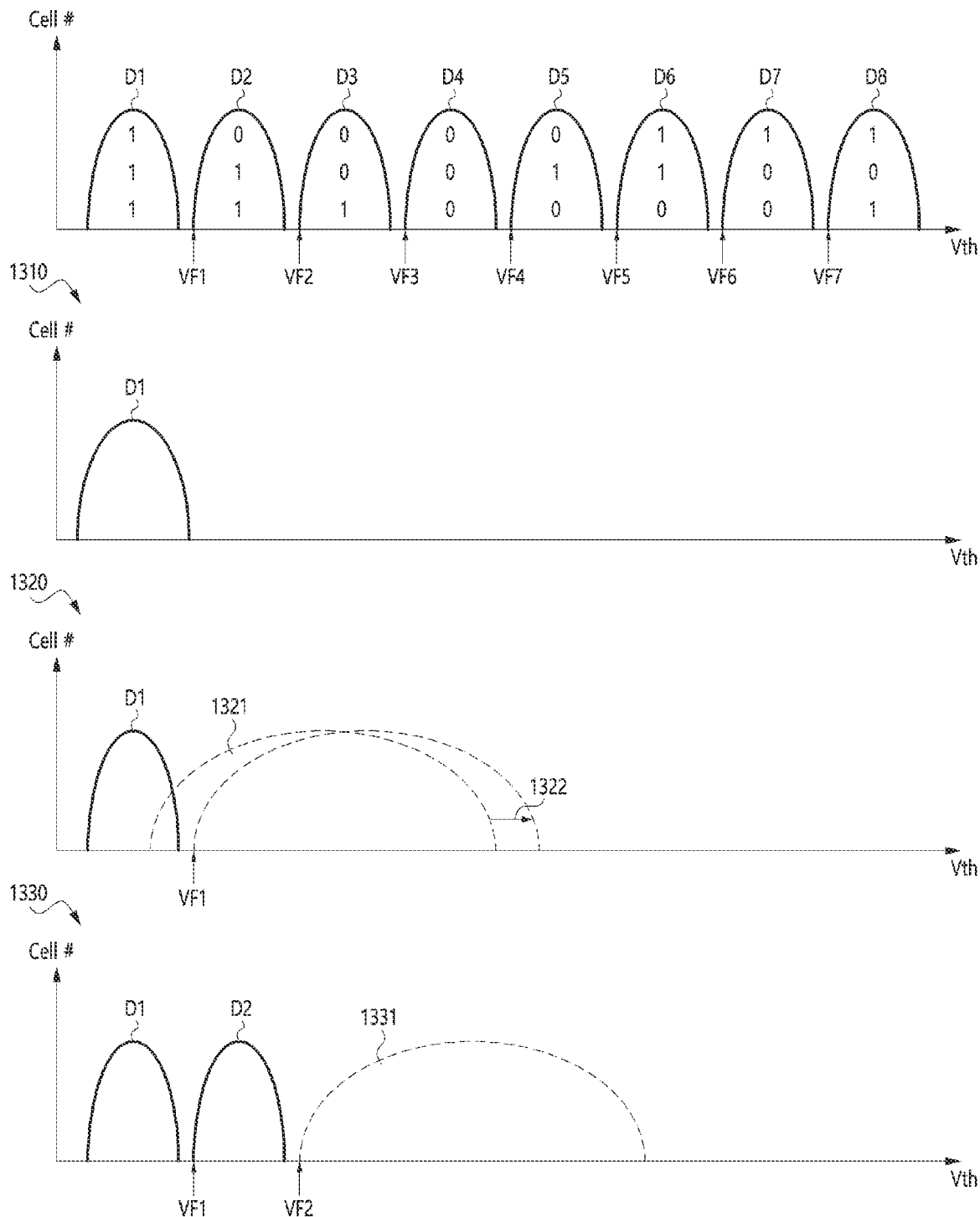
FIG. 13 is a diagram illustrating a program operation of a memory device in accordance with an embodiment.

FIG. 13 is a diagram illustrating a program operation of the memory device 110 in accordance with an embodiment.

Referring to FIG. 13, first to seventh program verification voltages VF1 to VF7 may be utilized during a program operation. The first to seventh program verification voltages VF1 to VF7 may correspond to the second to eighth threshold voltage distributions D2 to D8, respectively. The first to seventh program verification voltages VF1 to VF7 may be located, on the horizontal axis, at left edges of the second to eighth threshold voltage distributions D2 to D8, respectively. The first to seventh program verification voltages VF1 to VF7 may be is utilized to verify whether the second to eighth threshold voltage distributions D2 to D8 are properly formed through a program operation, respectively. A program verification voltage may be utilized in a similar manner as a read voltage for a read operation. The memory device 110 may apply, during a program operation, each of the first to seventh program verification voltages VF1 to VF7 to a word line coupled to the memory region WMR to determine at least one threshold voltage distribution related to the program operation, among the second to eighth threshold voltage distributions D2 to D8, which fails on the memory region WMR.

Specifically, referring to a case 1310 of FIG. 13, memory cells that are in an erased status within the memory region WMR may form the first threshold voltage distribution D1.

Referring to a case 1320 of FIG. 13, the memory device 110 may apply a program voltage more than once to a word line coupled to the memory region WMR to raise threshold voltages of program-permitted memory cells 1321, which are supposed to correspond to one of the second to eighth threshold voltage distributions D2 to D8. Then, in order to verify whether the threshold voltages of the program-permitted memory cells 1321 increase to be higher than the first program verification voltage VF1, the memory device 110 may apply the first program verification voltage VF1 to the word line coupled to the memory region WMR. When a number of memory cells having lower threshold voltages than the first program verification voltage VF1, among the program-permitted memory cells 1321, is determined to be higher than a program-failure reference number, despite sufficient application of the program voltage, the program operation may be determined to have failed for the second to eighth threshold voltage distributions D2 to D8.

In order to report the failure of program operation on the memory region WMR, the memory device 110 may provide the controller 120 with a program-failure report. The program-failure report may include information on at least one threshold voltage distribution (in this case, the second to eighth threshold voltage distributions D2 to D8) related to the the program operation, which fails on the memory region WMR.

In an embodiment, the program-failure report may include the failure-number. The failure-number may represent the number of memory cells on which the program operation fails within the memory region WMR. Specifically, the failure-number in this case may represent the number of memory cells having lower threshold voltages than the first program verification voltage VF1, among the program-permitted memory cells 1321.

In the other case, i.e., when the program-permitted memory cells 1321 are properly programmed through the application of program voltage, the threshold voltages of the program-permitted memory cells 1321 may properly rise as illustrated by an arrow 1322 in FIG. 13. In this case, the memory device 110 may determine, as less than the program-failure reference number, a number of memory cells having lower threshold voltages than the first program verification is voltage VF1, among the program-permitted memory cells 1321.

Then, referring to a case 1330 of FIG. 13, the memory device 110 may apply a program voltage more than once to the word line coupled to the memory region WMR to raise threshold voltages of the program-permitted memory cells 1331, which are supposed to correspond to one of the third to eighth threshold voltage distributions D3 to D8. Afterwards, the second program verification voltage VF2 may be applied in a similar manner as the first program verification voltage VF1. The memory device 110 may utilize each of the third to seventh program verification voltages VF3 to VF7 in a similar manner as the first program verification voltage VF1.

Figure 14:
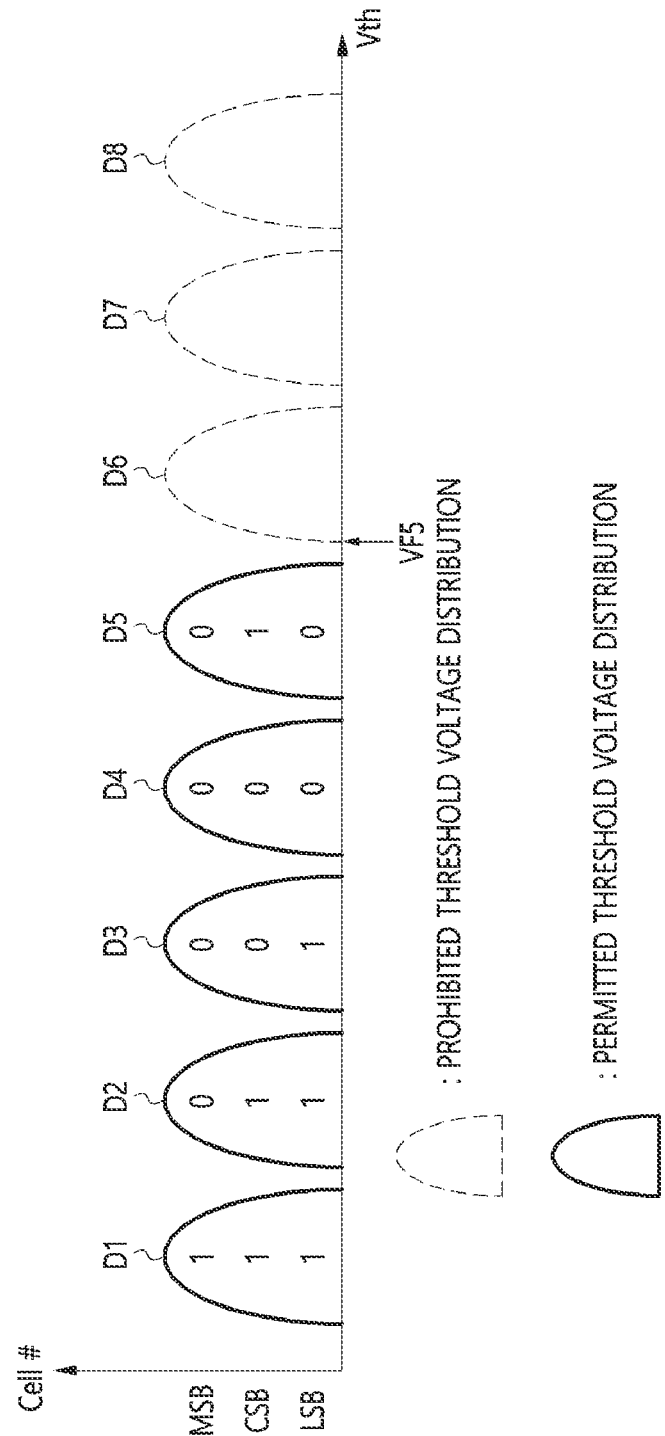
FIG. 14 is a diagram illustrating a scheme that a controller in accordance with an embodiment sets a prohibited threshold voltage distribution when a program operation fails on a memory region.

FIG. 14 is a diagram illustrating a scheme that the controller 120 in accordance with an embodiment sets a prohibited threshold voltage distribution when a program operation fails on a memory region WMR.

Referring to FIG. 14, during a program operation on the memory region WMR, the first to fifth threshold voltage distributions D1 to D5 may be properly formed but the sixth to eighth threshold voltage distributions D6 to D8 might not be properly formed. For example, the memory device 110 may determine, as higher than the program-failure reference number, the number of memory cells having lower threshold voltages than the fifth program verification voltage VF5, among the program-permitted memory cells, which are supposed to correspond to one of the sixth to eighth threshold voltage distributions D6 to D8 within the memory region WMR. In this case, the memory is device 110 may determine the program operation to have failed for the sixth to eighth threshold voltage distributions D6 to D8 and may provide the controller 120 with the program-failure report.

In response to the program-failure report, the controller 120 may set the sixth to eighth threshold voltage distributions D6 to D8 as the prohibited threshold voltage distributions for the memory region WMR. The first to fifth threshold voltage distributions D1 to D5 may be the permitted threshold voltage distributions for the memory region WMR.

Differently from the illustration, in an embodiment, the controller 120 may set only a part of the sixth to eighth threshold voltage distributions D6 to D8, e.g., the sixth threshold voltage distribution D6, as the prohibited threshold voltage distribution.

In an embodiment, the controller 120 may set at least one prohibited threshold voltage distribution for the memory region WMR in a descending order from the highest eighth threshold voltage distribution D8 to the lowest first threshold voltage distribution D1. For example, the controller 120 may set, as the prohibited threshold voltage distribution for the memory region WMR, the eighth threshold voltage distribution D8 when receiving a first program-failure report for the memory region WMR and then may set, also as the prohibited threshold voltage distribution for the memory region WMR, the seventh threshold voltage distribution D7 when receiving a second program-failure report for the memory region WMR.

In an embodiment, based on the failure-number included is in the program-failure report, the controller 120 may determine how many prohibited threshold voltage distributions are to be set at a time for the memory region WMR. For example, the controller 120 may set, at a time, a greater number of prohibited threshold voltage distributions for the memory region WMR as the failure-number increases. For example, the controller 120 may determine how many prohibited threshold voltage distributions are to be set at a time for the memory region WMR by comparing two (2) or more reference numbers with the failure-number. In an embodiment, the controller 120 may set a fixed number of prohibited threshold voltage distributions that are to be set at a time for the memory region WMR, regardless of the failure-number.

While setting the sixth to eighth threshold voltage distributions D6 to D8 as the prohibited threshold voltage distributions for the memory region WMR, the controller 120 may set, as the prohibited data patterns, data patterns respectively mapped to the sixth to eighth threshold voltage distributions D6 to D8. In an embodiment, the controller 120 may set, as the prohibited data patterns, data patterns that do not have any relationship with the prohibited threshold voltage distributions, as described with reference to FIG. 6.

In an embodiment, the controller 120 may also set, for each and every memory region within the memory block MB1 including the memory region WMR, at least one prohibited threshold voltage distribution, and at least one prohibited data pattern, which are set for is the memory region WMR.

Figure 15:
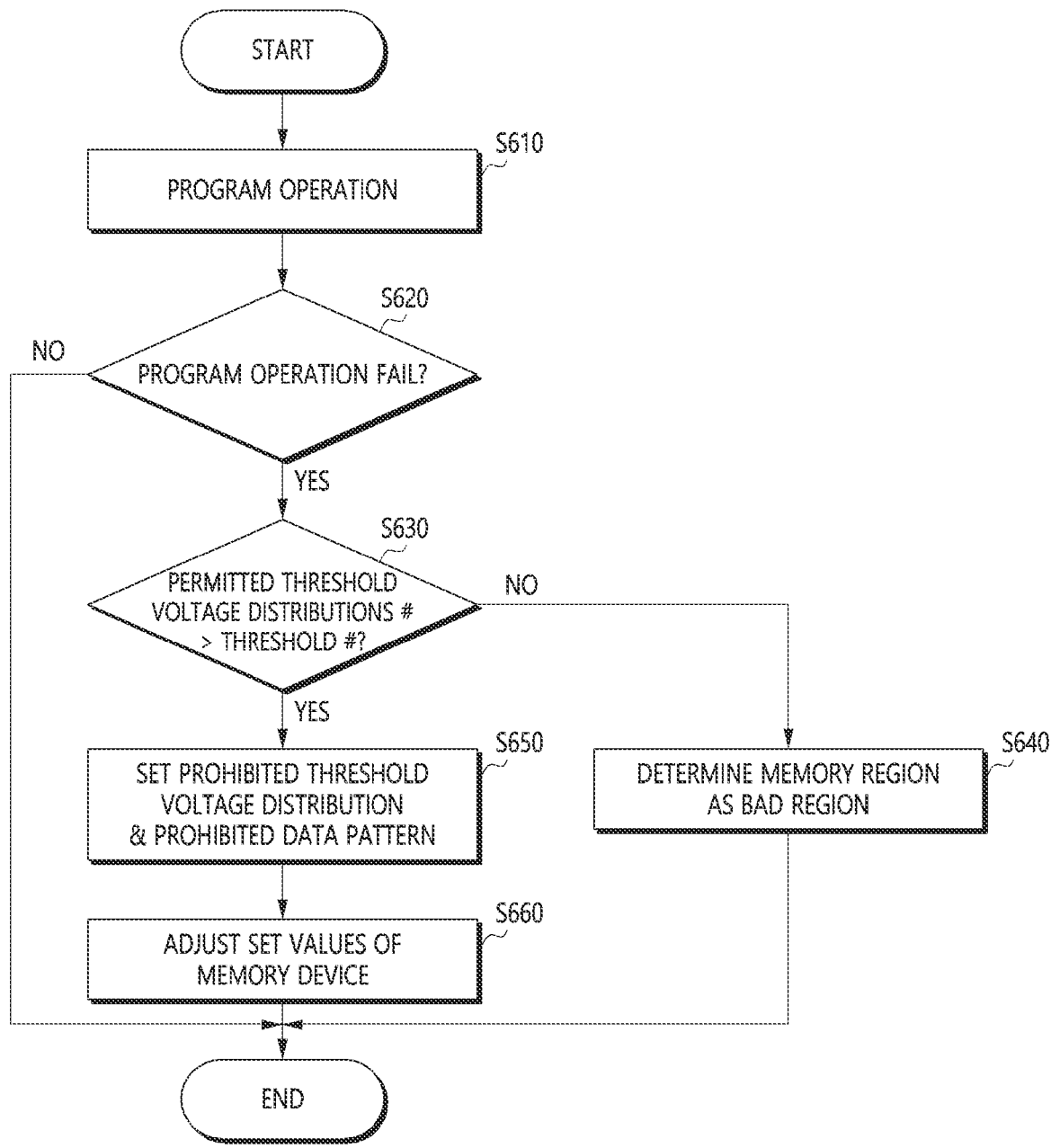
FIG. 15 is a flowchart illustrate an operation of a controller in accordance with an embodiment.

FIG. 15 is a flowchart illustrate an operation of the controller 120 in accordance with an embodiment. FIG. 15 illustrates a process of determining a memory region WMR as a vulnerable memory region based on a result of a program operation on the memory region WMR. Steps 630 to S660 of FIG. 15 may be performed in the substantially same manner as steps S140 to S170 of FIG. 8, and detailed description thereon will be omitted.

Referring to FIG. 15, at step S610, the controller 120 may control the memory device 110 to perform a program operation on the memory region WMR. The program operation may be performed in response to or regardless of a write request from a host device.

At step S620, the controller 120 may determine whether the program operation fails on the memory region WMR. When receiving the program-failure report from the memory device 110, the controller 120 may determine that the program operation has failed on the memory region WMR. When the program operation is successful on the memory region WMR, the process may end. When the program operation fails on the memory region WMR, the process may proceed to step S630.

Figure 16:
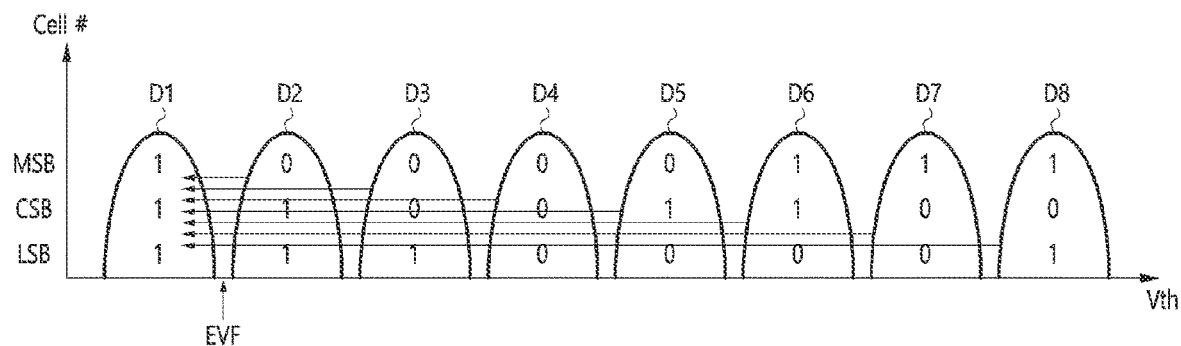
FIG. 16 is a diagram illustrating an erase operation of a memory device in accordance with an embodiment.

FIG. 16 is a diagram illustrating an erase operation of the memory device 110 in accordance with an embodiment.

Referring to FIG. 16, an erase verification voltage EVF may be utilized during an erase operation. The erase verification voltage EVF may be located, on the horizontal axis, at a right edge of is the first threshold voltage distribution D1 that memory cells in an erased status form within the memory region WMR. The erase verification voltage EVF may be utilized to verify whether threshold voltages of the memory cells corresponding to the second to eighth threshold voltage distributions D2 to D8 within the memory region WMR are lowered through an erase operation such that the memory cells corresponds to the first threshold voltage distribution D1. The erase verification voltage EVF may be utilized in a similar manner as a read voltage for a read operation. During an erase operation, the memory device 110 may apply the erase verification voltage EVF to word lines WL1 to WLn coupled to the memory block MB1 including the memory region WMR. When the threshold voltages of the memory cells corresponding to the second to eighth threshold voltage distributions D2 to D8 are not lowered into the first threshold voltage distribution D1 despite several applications of the erase verification voltage EVF to the memory block MB1, the memory device 110 may determine that the erase operation has failed on the memory block MB1.

Specifically, when the erase verification voltage EVF is applied to all the word lines WL1 to WLn coupled to the memory block MB1, each of the read/write circuits RW1 to RWm of FIG. 2 may sense a current running from memory cells coupled to a corresponding bit line to generate an erase pass signal or an erase failure signal. For example, each of the read/write circuits RW1 to RWm may generate the erase pass signal when a number of memory cells having higher is threshold voltages than the erase verification voltage EVF is less than a first erase failure reference number, among the memory cells coupled to the corresponding bit line. However, each of the read/write circuits RW1 to RWm may generate the erase failure signal when the number of memory cells having higher threshold voltages than the erase verification voltage EVF is higher than the first erase failure reference number, among the memory cells coupled to the corresponding bit line.

The memory device 110 may determine that the erase operation has succeeded on the memory block MB1 when a number of erase failure signals from the read/write circuits RW1 to RWm are less than a second erase failure reference number. The memory device 110 may determine that the erase operation has failed on the memory block MB1 when the number of erase failure signals from the read/write circuits RW1 to RWm is higher than the second erase failure reference number.

In order to report the failure of erase operation on the memory block MB1, the memory device 110 may provide the controller 120 with an erase-failure report. In an embodiment, the erase-failure report may include information on the failure-number representing the number of erase failure signals from the read/write circuits RW1 to RWm.

In an embodiment, under the control of the controller 120, the memory device 110 may apply the erase verification voltage EVF only to a word line coupled to the memory region WMR to determine whether the erase operation has succeed or failed on memory cells is within the memory region WMR. For example, each of the read/write circuits RW1 to RWm may generate the erase pass signal when a memory cell coupled to a corresponding bit line has a lower threshold voltage than the erase verification voltage EVF among the memory cells within the memory region WMR. However, each of the read/write circuits RW1 to RWm may generate the erase failure signal when a memory cell coupled to a corresponding bit line has a higher threshold voltage than the erase verification voltage EVF among the memory cells within the memory region WMR. The memory device 110 may determine that the erase operation has succeeded on the memory region WMR when a number of erase failure signals from the read/write circuits RW1 to RWm are less than a second erase failure reference number. The memory device 110 may determine that the erase operation has failed on the memory region WMR when the number of erase failure signals from the read/write circuits RW1 to RWm is higher than the second erase failure reference number. In order to report the failure of erase operation on the memory region WMR, the memory device 110 may provide the controller 120 with an erase-failure report. In an embodiment, the erase-failure report may include information on the failure-number representing the number of erase failure signals from the read/write circuits RW1 to RWm. In this case, the failure-number may represent the number of memory cells, among the memory cells within the memory region WMR, on which the erase operation fails. In other words, the failure-number may represent a number of memory cells, which have higher threshold voltages than is the erase verification voltage EVF, among the memory cells within the memory region WMR.

Figure 17:
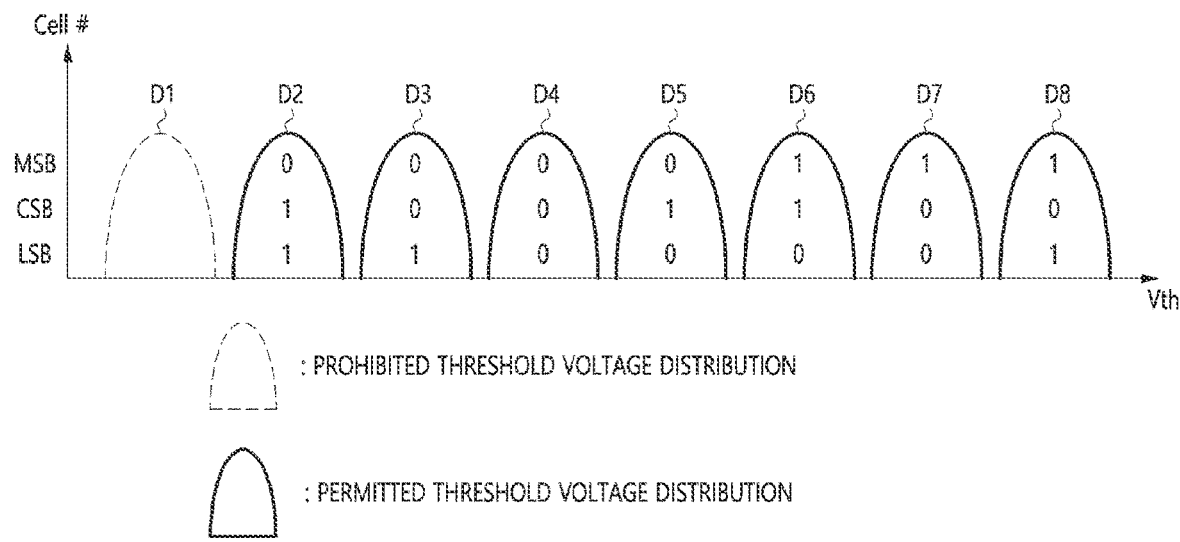
FIG. 17 is a diagram illustrating a scheme that a controller in accordance with an embodiment sets a prohibited threshold voltage distribution when an erase operation fails on a memory block.

FIG. 17 is a diagram illustrating a scheme that the controller 120 in accordance with an embodiment sets a prohibited threshold voltage distribution when an erase operation fails on the memory block MB1.

Referring to FIG. 17, in response to the erase-failure report from the memory device 110, the controller 120 may set the first threshold voltage distribution D1 as the prohibited threshold voltage distribution for the memory block MB1. That is, because the threshold voltages of the memory cells within the memory block MB1 cannot be lowered below the erase verification voltage EVF, the controller 120 may determine to control the memory cells within the memory block MB1 to not correspond to the first threshold voltage distribution D1, lower than the erase verification voltage EVF.

In an embodiment, the controller 120 may set at least one prohibited threshold voltage distribution for the memory block MB1 in an ascending order from the lowest first threshold voltage distribution D1 to the highest eighth threshold voltage distribution D8. For example, the controller 120 may set, as the prohibited threshold voltage distribution for the memory block MB1, the first threshold voltage distribution D1 when receiving a first erase-failure report for the memory block MB1 and then may set, also as the prohibited threshold voltage distribution for the memory block MB1, the second threshold voltage distribution D2 when receiving a second erase-failure is report for the memory block MB1.

In an embodiment, based on the failure-number included in the erase-failure report, the controller 120 may determine how many prohibited threshold voltage distributions are to be set at a time for the memory block MB1. For example, the controller 120 may set, at a time, a greater number of prohibited threshold voltage distributions for the memory block MB1 as the failure-number increases. For example, the controller 120 may determine how many prohibited threshold voltage distributions are to be set at a time for the memory block MB1 by comparing two (2) or more reference numbers with the failure-number. In an embodiment, the controller 120 may set a fixed number of prohibited threshold voltage distributions that are to be set at a time for the memory block MB1, regardless of the failure-number.

While setting the first threshold voltage distribution D1 as the prohibited threshold voltage distribution for the memory block MB1, the controller 120 may set, as the prohibited data pattern, a data pattern mapped to the first threshold voltage distribution D1. In an embodiment, the controller 120 may set, as the prohibited data pattern, a data pattern that does not have any relationship with the prohibited threshold voltage distribution, as described with reference to FIG. 6.

In an embodiment, the controller 120 may receive, from the memory device 110, the erase-failure report for the single memory region WMR and may set at least one prohibited threshold voltage distribution and at least one prohibited data pattern for the single memory region WMR.

Figure 18:
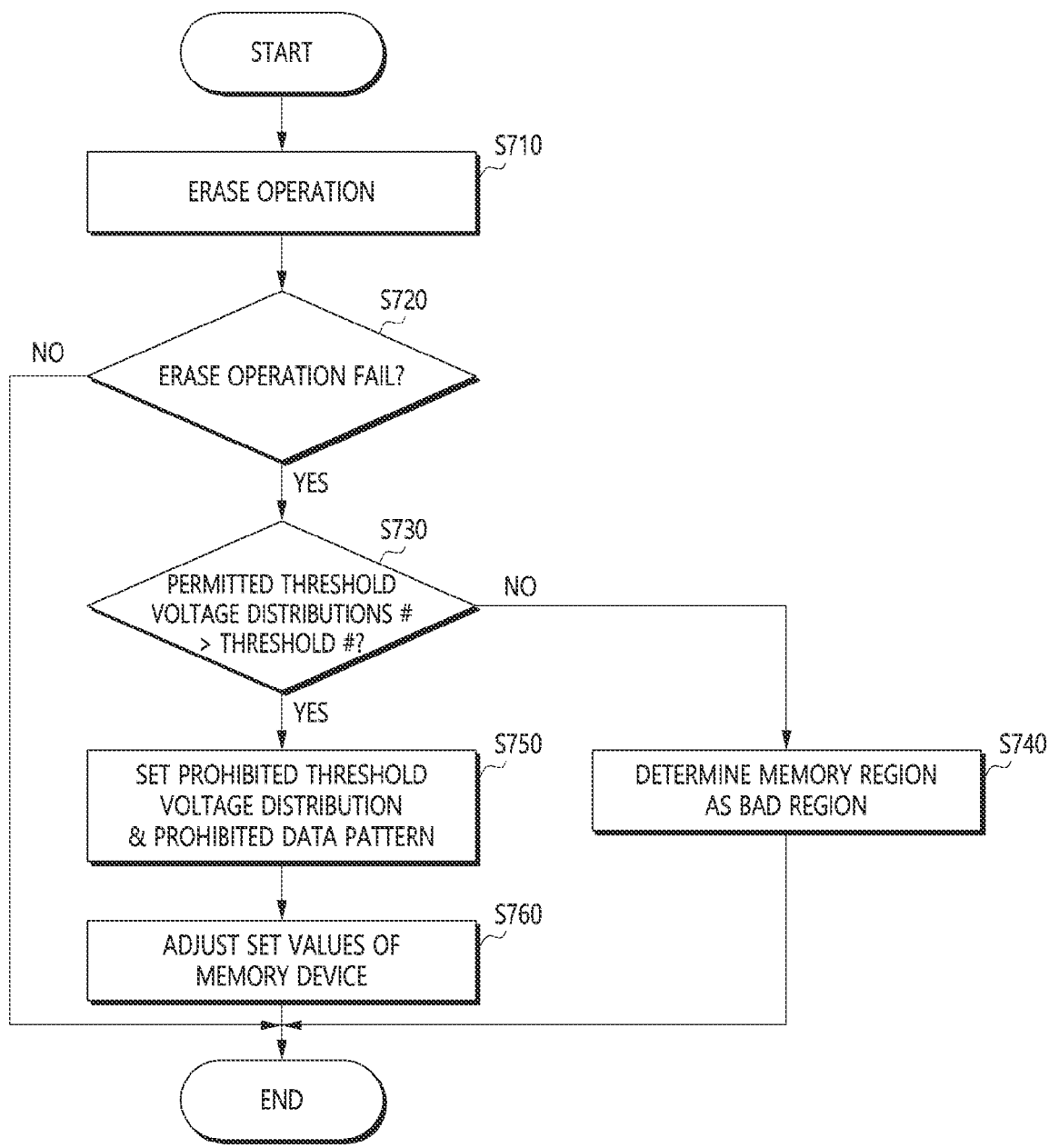
FIG. 18 is a flowchart illustrate an operation of a controller in accordance with an embodiment.

FIG. 18 is a flowchart illustrate an operation of the controller 120 in accordance with an embodiment. FIG. 18 illustrates a process of determining the memory block MB1 as a vulnerable memory block based on a result of erase operation on the memory block MB1.

Referring to FIG. 18, at step S710, the controller 120 may control the memory device 110 to perform an erase operation on the memory block MB1.

At step S720, the controller 120 may determine whether the erase operation fails on the memory block MB1. When receiving the erase-failure report from the memory device 110, the controller 120 may determine that the erase operation has failed on the memory block MB1. When the erase operation is successful on the memory block MB1, the process may end. When the erase operation fails on the memory block MB1, the process may proceed to step S730.

At step S730, the controller 120 may determine whether a current number of permitted threshold voltage distributions for the memory block MB1 is higher than a threshold number. When the current number of permitted threshold voltage distributions is not higher than the threshold number, the process may proceed to step S740. When the current number of permitted threshold voltage distributions is higher than the threshold number, the process may proceed to step S750.

At step S740, the controller 120 may determine the memory block MB1 to be a bad memory block. The controller 120 may is prohibit use of the bad memory block.

At step S750, the controller 120 may determine the memory block MB1 to be a vulnerable memory block and may set at least one prohibited threshold voltage distribution and at least one prohibited data pattern for the memory block MB1. The controller 120 may remap the permitted threshold voltage distributions and the permitted data patterns for the memory block MB1.

At step S760, the controller 120 may adjust the set values of the memory device 110 based on the at least one prohibited threshold voltage distribution and at least one prohibited data pattern set for the memory block MB1.

In an embodiment, steps S720 to S760 may be performed for the single memory region WMR.

In accordance with an embodiment, a storage device may reduce the loss of storage capacity of a memory device.

While certain embodiments have been described above, it will be understood to those skilled in the art that the embodiments described are by way of example only. Accordingly, the storage device should not be limited based on the described embodiments. Rather, the storage device described herein should only be limited in light of the claims that follow when taken in conjunction with the above description and accompanying drawings.

What is claimed is:

1. A storage device comprising:
a memory device including a memory region including memory cells; and
a controller configured to set at least one prohibited threshold voltage distribution among a plurality of threshold voltage distributions formed by the memory cells when a predetermined condition is satisfied and configured to control a program operation of the memory device so that the memory cells do not form the prohibited threshold voltage distribution,
wherein the predetermined condition includes a number of fail bits in data read from the memory region exceeding a reference number.

2. The storage device of claim 1, wherein the controller is configured to set, as the prohibited threshold voltage distribution, a threshold voltage distribution corresponding to a highest failure-number, among the plurality of threshold voltage distributions.

3. The storage device of claim 1, wherein the controller is configured to set, when a program operation fails on the memory region, the prohibited threshold voltage distribution in a descending order from a highest threshold voltage distribution to a lowest threshold voltage distribution among the plurality of threshold voltage distributions.

4. The storage device of claim 1, wherein the controller is configured to set, when an erase operation fails on the memory region, the prohibited threshold voltage distribution in an ascending order from a lowest threshold voltage distribution to a highest threshold voltage distribution among the plurality of threshold voltage distributions.

5. The storage device of claim 1, wherein, based on the number of fail bits, the controller is configured to determine how many prohibited threshold voltage distributions are to be set at a time for the memory region.

6. The storage device of claim 1, wherein, based on which operation is being performed on the memory region and a failure-number calculated therein, the controller is configured to determine how many prohibited threshold voltage distributions are to be set at a time for the memory region.

7. The storage device of claim 6, wherein, when the operation is a program operation, the failure-number is a number of memory cells having threshold voltages lower than a selected program verification voltage among memory cells that are supposed to have threshold voltages higher than the selected program verification voltage within the memory region.

8. The storage device of claim 6, wherein, when the operation is an erase operation, the failure-number is a number of memory cells having threshold voltages higher than an erase verification voltage among the memory cells.

9. The storage device of claim 1, wherein, before setting the prohibited threshold voltage distribution, the controller is configured to determine the memory region as a bad memory region when a number of permitted threshold voltage distributions for the memory region is determined to be lower than a threshold number.

10. The storage device of claim 1, wherein the controller is configured to set at least one prohibited data pattern for the memory region while setting the prohibited threshold voltage distribution.

11. The storage device of claim 10, wherein the controller is configured to re-map permitted threshold voltage distributions and permitted data patterns, the permitted threshold voltage distributions being threshold voltage distributions other than the prohibited threshold voltage distribution and the permitted data patterns being data patterns other than the at least one prohibited data pattern.

12. The storage device of claim 10, wherein the controller is configured to store write data in the memory region when the write data does not include the at least one prohibited data pattern and configured to store the write data in another memory region other than the memory region when the write data includes the at least one prohibited data pattern.

13. The storage device of claim 1, wherein the controller is configured to adjust set values of the memory device based on the prohibited threshold voltage distribution.

14. The storage device of claim 13, wherein the memory device is configured to perform an access operation on the memory region according to the adjusted set values.

15. A storage device comprising:
a memory device including a memory region including memory cells; and
a controller configured to determine failure-numbers of a plurality of threshold voltage distributions formed by the memory cells by performing an access operation on the memory region and configured to set a threshold voltage distribution corresponding to the largest number of the failure-numbers as a prohibited threshold voltage distribution for the memory region.

16. A storage device comprising:
a memory device including memory cells; and
a controller configured to set a prohibited data pattern, among a plurality of data patterns respectively mapped to a plurality of threshold voltage distributions of the memory cells when a predetermined condition is satisfied, configured to determine whether write data to be stored in the memory device includes the prohibited data pattern by comparing the write data with the prohibited data pattern, configured to store the write data in the memory cells when it is determined that the write data does not include the prohibited data pattern, and configured to store the write data in another memory cells other than the memory cells when it is determined that the write data includes the prohibited data pattern,
wherein the predetermined condition includes a number of fail bits in data read from the memory cells exceeding a reference number.

17. The storage device of claim 16, wherein the controller is configured to set a prohibited threshold voltage distribution, among the plurality of threshold voltage distributions, and configured to re-map remaining threshold voltage distributions and remaining data patterns, the remaining threshold voltage distributions being threshold voltage distributions other than the prohibited threshold voltage distribution and the remaining data patterns being data patterns other than the prohibited data pattern.

* * * * *